US012752758B2

(12) United States Patent
Maruyama et al.

(10) Patent No.: US 12,752,758 B2
(45) Date of Patent: Oct. 6, 2026

(54) BRAKING CONTROL DEVICE FOR VEHICLE

(71) Applicant: ADVICS CO., LTD., Kariya (JP)

(72) Inventors: Masaki Maruyama, Kariya (JP); Takayuki Yamamoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 452 days.

(21) Appl. No.: 18/551,666

(22) PCT Filed: Mar. 22, 2022

(86) PCT No.: PCT/JP2022/013005
§ 371 (c)(1),
(2) Date: Sep. 21, 2023

(87) PCT Pub. No.: WO2022/202763
PCT Pub. Date: Sep. 29, 2022

(65) Prior Publication Data
US 2024/0166186 A1 May 23, 2024

(30) Foreign Application Priority Data
Mar. 22, 2021 (JP) ................................ 2021-046766

(51) Int. Cl.
*B60T 13/68* (2006.01)
*B60L 7/18* (2006.01)
(Continued)

(52) U.S. Cl.
CPC .............. *B60T 13/686* (2013.01); *B60L 7/18* (2013.01); *B60L 7/24* (2013.01); *B60L 7/26* (2013.01);
(Continued)

(58) Field of Classification Search
CPC .... B60T 13/686; B60T 13/586; B60T 8/1766; B60T 8/267; B60T 8/306; B60T 8/3255;
(Continued)

(56) References Cited

U.S. PATENT DOCUMENTS 6,406,105 B1 * 6/2002 Shimada .................. B60L 7/26 303/152
2002/0030408 A1 * 3/2002 Niwa .................. B60K 17/354 903/918
(Continued)

FOREIGN PATENT DOCUMENTS

CN 102481913 A 5/2012
CN 110774900 A 2/2020
(Continued)

OTHER PUBLICATIONS

International Search Report Issued May 31, 2022, in PCT/JP2022/013005, filed on Mar. 22, 2022, therein, 2 pages.

*Primary Examiner* — Thomas J Williams
(74) *Attorney, Agent, or Firm* — Oblon, McClelland, Maier & Neustadt, L.L.P.

(57) ABSTRACT

An actuator supplies a front wheel brake fluid pressure and a rear wheel brake fluid pressure equal to generate front and rear wheel frictional braking forces. A controller calculates a braking force required as a whole of a vehicle, and calculates front and rear wheel required braking forces so that a sum of the front and rear wheel required braking force matches a target vehicle body braking force and the ratio of the rear wheel required braking force to the front wheel required braking force is a constant value. A rear wheel restricted regenerative braking force is calculated by multiplying the maximum front wheel regenerative braking force by a constant value, and the smaller one of maximum rear wheel regenerative braking force and the rear wheel
(Continued)

restricted regenerative braking force is determined as the rear wheel reference regenerative braking force.

4 Claims, 7 Drawing Sheets

(51) Int. Cl.

| | |
|---|---|
| ***B60L 7/24*** | (2006.01) |
| ***B60L 7/26*** | (2006.01) |
| ***B60T 8/1766*** | (2006.01) |
| ***B60T 8/26*** | (2006.01) |
| ***B60T 8/30*** | (2006.01) |
| ***B60T 8/32*** | (2006.01) |
| ***B60T 13/58*** | (2006.01) |

(52) U.S. Cl.
CPC ............ *B60T 8/1766* (2013.01); *B60T 8/267* (2013.01); *B60T 8/306* (2013.01); *B60T 8/3255* (2013.01); *B60T 13/586* (2013.01); *B60T 2270/604* (2013.01); *B60T 2270/608* (2013.01); *B60T 2270/82* (2013.01)

(58) Field of Classification Search
CPC ......... B60T 2270/604; B60T 2270/608; B60T 2270/82; B60L 7/18; B60L 7/24; B60L 7/26
See application file for complete search history.

(56) References Cited

U.S. PATENT DOCUMENTS

| | | | | |
|---|---|---|---|---|
| 2002/0180266 | A1* | 12/2002 | Hara ............... | B60W 30/18109 903/918 |
| 2003/0080614 | A1* | 5/2003 | Soga ......................... | B60L 7/18 903/918 |
| 2013/0211644 | A1* | 8/2013 | Yokoyama ................ | B60L 7/26 701/22 |
| 2017/0066331 | A1 | 3/2017 | Jeon et al. | |
| 2019/0092303 | A1 | 3/2019 | Kato et al. | |
| 2024/0166186 | A1* | 5/2024 | Maruyama .............. | B60T 11/26 |

FOREIGN PATENT DOCUMENTS

| | | |
|---|---|---|
| JP | 2017-52502 A | 3/2017 |
| JP | 2019-59458 A | 4/2019 |

* cited by examiner

BRAKING CONTROL DEVICE FOR VEHICLE

TECHNICAL FIELD

The present disclosure relates to a braking control device for a vehicle.

BACKGROUND ART

Patent Literature 1 describes that "in a first stage in which regenerative braking force for one or more of the front wheels and the rear wheels is generated up to a reference deceleration and the braking forces for the front wheels and the rear wheels are distributed at the time of braking, after the front and rear wheel regenerative braking forces are distributed and generated by a reference braking distribution ratio, only the rear wheel regenerative braking force is generated up to the limit value of the rear wheel regenerative braking force; if the rear wheel regenerative braking force increases up to the limit value of the rear wheel regenerative braking force, the proportion of the front wheel braking force is then increased; if the rear wheel regenerative braking force increases up to the limit value of the rear wheel regenerative braking force, only the front wheel fluid braking force is then generated and the proportion of the front wheel braking force is increased; if the proportion of the front wheel braking force increases and the distribution ratio between the front wheel braking force and the rear wheel braking force becomes the reference braking distribution ratio, the rear wheel regenerative braking force is then generated up to the maximum value of the rear wheel regenerative braking force" for the purpose of "providing a braking force control method at the time of regenerative braking coordination control for securing safety of braking system for independently controlling braking force of front wheel and rear wheel, improving fuel consumption, and distributing excellent braking force".

The applicant has developed a "braking control device capable of simultaneously applying separate fluid pressure to front wheels and rear wheels by one system of a pressurizing configuration using an electric motor" as described in Patent Literature 2. The braking control device "adjusts a front wheel brake fluid pressure of front wheel cylinders 71 and 72 provided on a front wheel of a vehicle and a rear wheel brake fluid pressure of rear wheel cylinders 73 and 74 provided on a rear wheel of the vehicle, including a fluid pressure generation unit 1A that adjusts a fluid pressure generated by an electric motor 11 to obtain an adjusted fluid pressure, and applies the adjusted fluid pressure as a rear wheel brake fluid pressure; and a fluid pressure correction unit 1B that reduces and adjusts the adjusted fluid pressure to obtain a corrected fluid pressure, and applies the corrected fluid pressure as a front wheel brake fluid pressure". Therefore, in the configuration of the braking control device, the front wheel brake fluid pressure is always equal to or lower than the rear wheel brake fluid pressure. That is, there is a restriction between the front wheel braking force and the rear wheel braking force on the generations thereof.

However, from the viewpoint of directional stability when the vehicle is braked, it is preferable that the relationship between the front wheel braking force and the rear wheel braking force is constant (That is, the ratio of the rear wheel braking force to the front wheel braking force is constant) during regenerative braking in which the regenerative braking device generates regenerative braking force. Furthermore, it is desired that this relationship is achieved with a configuration having the above-described restriction.

CITATIONS LIST

Patent Literature

Patent Literature 1: JP 2017-052502 A
Patent Literature 2: JP 2019-059458 A

BRIEF SUMMARY

Technical Problems

An object of the present disclosure is to provide a braking control device applied to a vehicle including regenerative braking devices on front and rear wheels, in which the relationship between the front and rear wheel braking forces is optimized with a restriction on the generation of the front and rear wheel braking forces.

Solutions to Problems

The braking control device for a vehicle according to the present disclosure is applied to a vehicle including front and rear wheel regenerative braking devices (KCf, KCr) that generate front and rear wheel regenerative braking forces (Fgf, Fgr) on front and rear wheels (WHf, WHr), and includes an actuator (HU) that supplies a front wheel brake fluid pressure (Pwf) to a front wheel cylinder (CWf) and a rear wheel brake fluid pressure (Pwr) equal to or larger than the front wheel brake fluid pressure to a rear wheel cylinder (CWr), and generates front and rear wheel frictional braking forces (Fmf, Fmr) on the front and rear wheels (WHf, WHr); and a controller (ECU) that controls the front and rear wheel regenerative braking devices (KCf, KCr) and the actuator (HU).

In the braking control device for a vehicle according to the present disclosure, the controller (ECU) calculates a braking force required as a whole of the vehicle as target vehicle body braking force (Fv), calculates the front and rear wheel required braking forces (Fqf, Fqr) so that, a sum of the front and rear wheel required braking forces (Fqf, Fqr) matches the target vehicle body braking force (Fv), and a ratio (Kq) of the rear wheel required braking force (Fqr) to the front wheel required braking force (Fqf) becomes a constant value (hb) (that is, "$Fv=Fqf+Fqr$" and "$Kq=Fqr/Fqf=hb$"), acquires maximum values of the front and rear wheel regenerative braking forces (Fgf, Fgr) that can be generated and are determined in operation states of the front and rear wheel regenerative braking devices (KCf, KCr) as the maximum front and rear wheel regenerative braking forces (Fxf, Fxr), calculates a rear wheel restricted regenerative braking force (Fsr) by multiplying the maximum front wheel regenerative braking force (Fxf) by the constant value (hb), and specifies the smaller one between the maximum rear wheel regenerative braking force (Fxr) and the rear wheel restricted regenerative braking force (Fsr) as a rear wheel reference regenerative braking force (Fkr). Then, the front wheel required braking force (Fqf) is achieved only by the front wheel regenerative braking force (Fgf) when the front wheel required braking force (Fqf) is equal to or less than the maximum front wheel regenerative braking force (Fxf) ($Fqf \leq Fxf$), and the front wheel required braking force (Fqf) is achieved by the front wheel regenerative braking force (Fgf) and the front wheel friction braking force (Fmf) when the front wheel required braking force (Fqf) is larger than the maximum front wheel regenerative braking force (Fxf) (Fqf>Fxf). In addition, the rear wheel required braking force (Fqr) is achieved only by the rear wheel regenerative braking force (Fgr) when the rear wheel required braking force (Fqr) is equal to or less than the rear wheel reference regenerative braking force (Fkr) (Fqr≤Fkr), and the rear wheel required braking force (Fqr) is achieved by the rear wheel regenerative braking force (Fgr) and the rear wheel friction braking force (Fmr) when the rear wheel required braking force (Fqr) is larger than the rear wheel reference regenerative braking force (Fkr) (Fqr>Fkr). For example, the controller (ECU) does not generate the rear wheel regenerative braking force (Fgr) when the front wheel regenerative braking device (KCf) cannot generate the front wheel regenerative braking force (Fgf).

The actuator HU has a restriction that the rear wheel brake fluid pressure Pwr is equal to or larger than the front wheel brake fluid pressure Pwf. However, according to the configuration above, when the front wheel regenerative braking device KCf falls into disorder and the front wheel regenerative braking force Fgf is hardly generated, the generation of the rear wheel regenerative braking force Fgr is limited based on the rear wheel reference regenerative braking force Fkr. Therefore, when there is a restriction on the generation of the front and rear wheel braking forces, the ratio Kq of the rear wheel required braking force Fqr to the front wheel required braking force Fqf is always maintained constant. Therefore, the relationship between the front and rear wheel braking forces is optimized, and the vehicle stability is improved.

The braking control device for a vehicle according to the present disclosure is applied to a vehicle including front and rear wheel regenerative braking devices (KCf, KCr) that generate front and rear wheel regenerative braking forces (Fgf, Fgr) on front and rear wheels (WHf, WHr), and includes an actuator (HU) that supplies a rear wheel brake fluid pressure (Pwr) to a rear wheel cylinder (CWr) and a front wheel brake fluid pressure (Pwf) equal to or larger than the rear wheel brake fluid pressure (Pwf) to a front wheel cylinder (CWf), and generates front and rear wheel frictional braking forces (Fmf, Fmr) on the front and rear wheels (WHf, WHr), and a controller (ECU) that controls the front and rear wheel regenerative braking devices (KCf, KCr) and the actuator (HU).

In the braking control device for a vehicle according to the present disclosure, the controller (ECU) calculates a braking force required as a whole of the vehicle as target vehicle body braking force (Fv), calculates the front and rear wheel required braking forces (Fqf, Fqr) so that, a sum of the front and rear wheel required braking forces (Fqf, Fqr) matches the target vehicle body braking force (Fv), and a ratio (Kq) of the rear wheel required braking force (Fqr) to the front wheel required braking force (Fqf) becomes a constant value (hb) (that is, "Fv=Fqf+Fqr" and "Kq=Fqr/Fqf=hb"), acquires maximum values of the front and rear wheel regenerative braking forces (Fgf, Fgr) that can be generated and are determined in operation states of the front and rear wheel regenerative braking devices (KCf, KCr) as the maximum front and rear wheel regenerative braking forces (Fxf, Fxr), calculates a front wheel restricted regenerative braking force (Fsf) by dividing the maximum rear wheel regenerative braking force (Fxr) by the constant value (hb), and specifies the smaller one between the maximum front wheel regenerative braking force (Fxf) and the front wheel restricted regenerative braking force (Fsf) as a front wheel reference regenerative braking force (Fkf). Then, the front wheel required braking force (Fqf) is achieved only by the front wheel regenerative braking force (Fgf) when the front wheel required braking force (Fqf) is equal to or less than the front wheel reference regenerative braking force (Fkf) (Fqf≤Fkf), and the front wheel required braking force (Fqf) is achieved by the front wheel regenerative braking force (Fgf) and the front wheel friction braking force (Fmf) when the front wheel required braking force (Fqf) is larger than the front wheel reference regenerative braking force (Fkf) (Fqf>Fkf). In addition, when the rear wheel required braking force (Fqr) is equal to or less than the maximum rear wheel regenerative braking force (Fxr) (Fqr≤Fxr), the rear wheel required braking force (Fqr) is achieved only by the rear wheel regenerative braking force (Fgr), and when the rear wheel required braking force (Fqr) is larger than the maximum rear wheel regenerative braking force (Fxr) (Fqr>Fxr), the rear wheel required braking force (Fqr) is achieved by the rear wheel regenerative braking force (Fgr) and the rear wheel friction braking force (Fmr). For example, the controller (ECU) does not generate the front wheel regenerative braking force (Fgf) when the rear wheel regenerative braking device (KCr) cannot generate the rear wheel regenerative braking force (Fgr).

The actuator HU has a restriction that the front wheel brake fluid pressure Pwf is equal to or larger than the rear wheel brake fluid pressure Pwr. However, according to the configuration above, when the rear wheel regenerative braking device KCr falls into disorder and the rear wheel regenerative braking force Fgr is hardly generated, the generation of the front wheel regenerative braking force Fgf is limited based on the front wheel reference regenerative braking force Fkf. Therefore, when there is a restriction on the generation of the front and rear wheel braking forces, the ratio Kq of the rear wheel required braking force Fqr to the front wheel required braking force Fqf is always maintained constant. Therefore, the relationship between the front and rear wheel braking forces is optimized, and the vehicle stability is improved.

DESCRIPTION OF EMBODIMENTS

<Symbols of Components>

In the description below, components such as members, signals, and values, denoted by the same symbol, like "CW" or the like, have the same function. The suffixes "f" and "r" attached to the end of various symbols related to the wheels are comprehensive symbols indicating elements related to certain aspects of either the front wheels or the rear wheels. Specifically, "f" indicates "an element related to the front wheel", and "r" indicates "an element related to the rear wheel". For example, in the wheel cylinder CW, it is described as "front wheel cylinder CWf, rear wheel cylinder CWr". Further, the suffixes "f" and "r" may be omitted. When these are omitted, each symbol indicates a generic name thereof.

<Vehicle JV Mounted with Braking Control Device SC>

Figure 1:
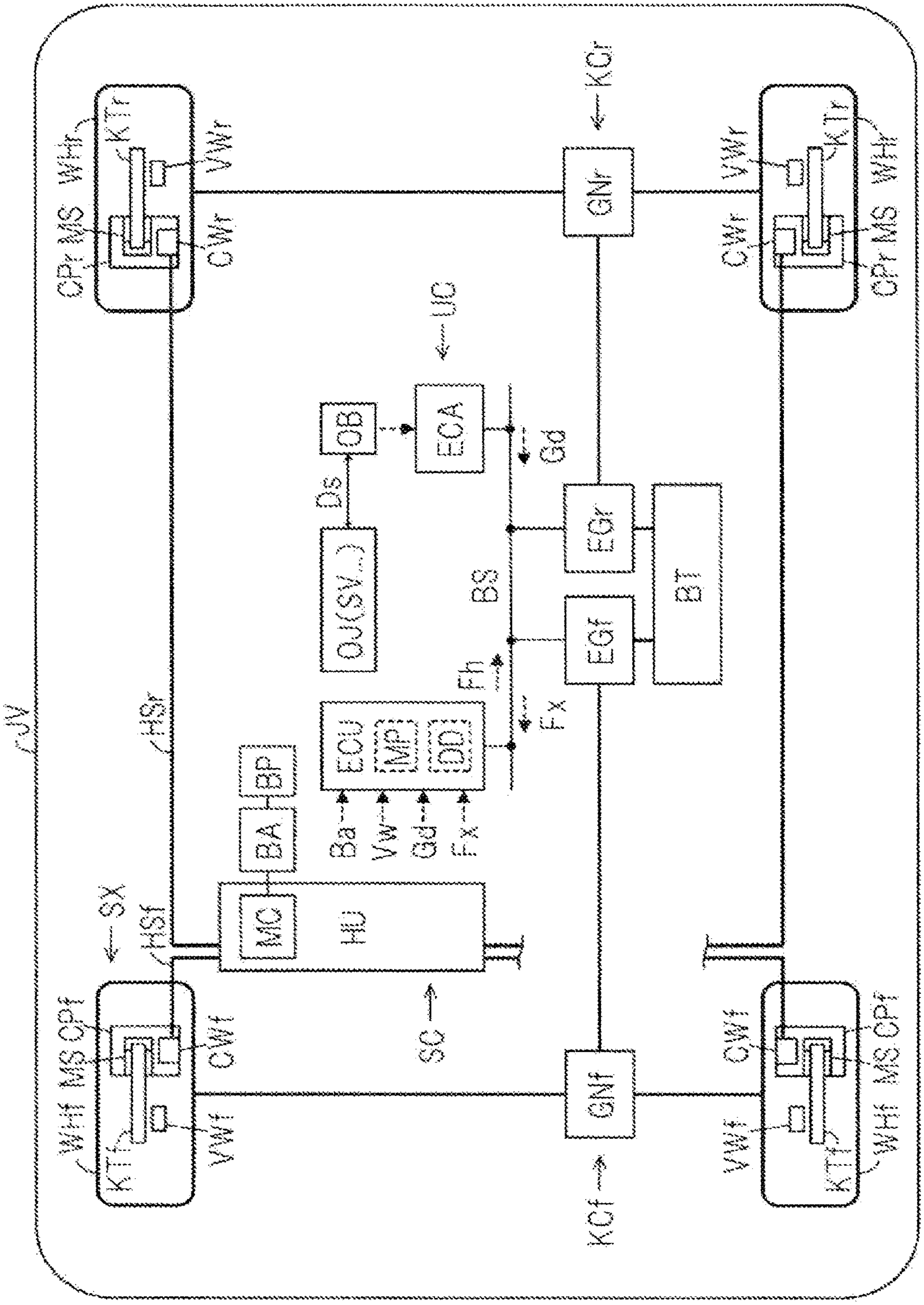
FIG. 1 is a configuration diagram for describing an entirety of a vehicle JV mounted with a braking control device SC.

An entirety of a vehicle mounted with a braking control device SC according to the first embodiment will be described with reference to the configuration diagram of FIG. 1. Here, the vehicle mounted with the braking control device SC is also referred to as a "current vehicle JV" in order to be distinguished from other vehicles (for example, a preceding vehicle SV).

The vehicle JV is a hybrid vehicle or an electric vehicle including a driving electric motor GN. The driving electric motor GN also functions as a generator for energy regeneration. The generator GN is provided on front wheels WHf and rear wheels WHr. The front and rear wheel generators GNf and GNr (=GN) are controlled (driven) by generator controllers EGf and EGr. Here, a device including the front wheel generator GNf and the controller EGf thereof is referred to as a "front wheel regenerative braking device KCf". In addition, a device including the rear wheel generator GNr and the controller EGr thereof is referred to as a "rear wheel regenerative braking device KCr". The vehicle JV includes storage batteries BT for the front and rear wheel regenerative braking devices KCf and KCr. That is, the front and rear wheel regenerative braking devices KCf and KCr also include storage batteries BT.

When the electric motor/generator GN (=GNf, GNr) operates as an driving electric motor (at the time of acceleration of the vehicle JV), electric power is supplied from the storage battery BT to the electric motor/generator GN via the controller EG for the regenerative braking device (also simply referred to as a "regenerative controller"). On the other hand, when the electric motor/generator GN operates as a generator (when the vehicle JV decelerates), the electric power from the generator GN is stored in the storage battery BT via the regenerative controller EG (That is, regenerative braking is performed). In the regenerative braking, the front and rear wheel regenerative braking forces Fgf and Fgr are independently and individually generated by the front and rear wheel generators GNf and GNr.

In the first embodiment, the regenerative capacity of the front and rear wheel regenerative braking device, the regenerative capacity of the front wheel regenerative braking device KCf is relatively larger than that of the rear wheel regenerative braking device KCr. That is, the front and rear wheel regenerative braking devices KCf and KCr generate the front and rear wheel regenerative braking forces Fgf and Fgr according to the vehicle body speed Vx, but the generation limit of the regenerative braking force of the front wheel regenerative braking device KCf is larger than that of the rear wheel regenerative braking device KCr. Therefore, the rear wheel regenerative braking device KCr reaches the generation limit of the regenerative braking force earlier than the front wheel regenerative braking device KCf.

The vehicle JV includes a braking device SX. The braking device SX generates front and rear wheel frictional braking forces Fmf and Fmr on the front wheel WHf and the rear wheel WHr. The braking device SX includes a rotating member (for example, a brake disc) KT and a brake caliper CP. The rotating member KT is fixed to the wheel WH, and the brake caliper CP is provided to sandwich the rotating member KT. The brake caliper CP is provided with a wheel cylinder CW. Brake fluid BF adjusted to a brake fluid pressure Pw is supplied from the braking control device SC to the wheel cylinder CW. A friction member (for example, a brake pad) MS is pressed against the rotating member KT by the brake fluid pressure Pw. Since the rotating member KT and the wheel WH are fixed to rotate integrally, a frictional braking force Fm is generated on the wheel WH by the frictional force generated at this time.

The vehicle JV includes a braking operation member BP and various sensors (BA and the like). The braking operation member (for example, a brake pedal) BP is a member operated by the driver to decelerate the vehicle. The vehicle JV is provided with a braking operation amount sensor BA that detects an operation amount (braking operation amount) Ba of the braking operation member BP. As the braking operation amount sensor BA, at least one of a simulator fluid pressure sensor PS that detects a fluid pressure (simulator fluid pressure) Ps of a stroke simulator SS (to be described later), an operation displacement sensor SP that detects an operation displacement Sp of the braking operation member BP, and an operation force sensor FP that detects an operation force Fp of the braking operation member BP is adopted. That is, at least one of the simulator fluid pressure Ps, the braking operation displacement Sp, and the braking operation force Fp is detected as the braking operation amount Ba by the operation amount sensor BA. The braking operation amount Ba is input to a controller ECU for the braking control device SC (also simply referred to as a "braking controller"). The vehicle JV includes various sensors including a wheel speed sensor VW that detects the rotational speed (wheel speed) Vw of the wheel WH. Detection signals (Ba and the like) of these sensors are input to the braking controller ECU. In the braking controller ECU, a vehicle body speed Vx is calculated based on the wheel speed Vw.

The vehicle JV includes a braking control device SC to execute so-called regenerative coordination control (control to coordinate and operate the regenerative braking force Fg and the friction braking force Fm). In the braking control device SC, a so-called front-rear type (also referred to as "type II") is adopted as a two-system brake system. The braking control device SC adjusts the actual brake fluid pressure Pw according to the operation amount Ba of the braking operation member BP, and supplies the brake fluid pressure Pw to the braking device SX (In particular, the wheel cylinder CW) via front and rear wheel communication paths HSf and HSr. The braking control device SC includes a fluid unit HU (also referred to as an "actuator") including the master cylinder CM and a controller ECU (braking controller) for the braking control device SC.

The fluid unit HU (to be described later) is controlled by the braking controller ECU. The controller ECU for the braking control device SC includes a microprocessor MP that performs signal processing, and a drive circuit DD that drives electromagnetic valves and electric motors. The braking controller ECU, the controller EG (=EGf, EGr) for the regenerative braking device, and a controller ECA (to be described later) for the driving assistance device are respectively connected to a communication bus BS. Therefore, information (detection value, calculation value) is shared between these controllers via the communication bus BS. For example, the vehicle body speed Vx is calculated by the braking controller ECU and transmitted to the controller ECA for the driving assistance device (also simply referred to as a "driving assistance controller") via the communication bus BS. Target deceleration Gd is calculated by the driving assistance controller ECA and transmitted to the braking controller ECU via the communication bus BS. Target regenerative braking forces Fh (=Fhf, Fhr) (to be described later) is calculated by the braking controller ECU and transmitted to the regenerative controller EG (=EGf, EGr) via the communication bus BS. The maximum regenerative braking force Fx (=Fxf, Fxr) (to be described later) is calculated by the regenerative controller EG (=EGf, EGr) and transmitted to the braking controller ECU via the communication bus BS. The braking operation amount Ba, the wheel speed Vw, the target deceleration Gd, the maximum regenerative braking force Fx, and the like are input to the braking controller ECU. The fluid unit HU is controlled by the braking controller ECU based on these signals.

The vehicle JV is provided with a driving assistance device UC that performs automatic braking instead of or to assist the driver. The driving assistance device UC includes an object detection sensor OB that detects a distance Ds (relative distance) to an object OJ (including a preceding vehicle SV traveling in front of the current vehicle JV) in front of the current vehicle JV, and a controller ECA for the driving assistance device. For example, a radar sensor, a millimeter wave sensor, an image sensor, or the like is adopted as the object detection sensor OB. The driving assistance controller ECA calculates the target deceleration Gd of the current vehicle JV (the target value of the vehicle body acceleration in the front-rear direction of the current vehicle JV) based on a detection result Ds (relative distance) of the object detection sensor OB. The target deceleration Gd (the target front-rear acceleration of the vehicle body) is transmitted from the driving assistance controller ECA to the braking controller ECU via the communication bus BS. Then, the braking control device SC generates the braking forces Fg and Fm according to the target deceleration Gd.

First Embodiment of Braking Control Device SC

A first embodiment (particularly, a configuration example of the fluid unit HU) of the braking control device SC will be described with reference to the schematic diagram of FIG. 2. The braking control device SC includes a fluid unit HU as a pressure source for increasing the fluid pressure (brake fluid pressure) Pw in four wheel cylinders CW. In the example of the braking control device SC, the fluid unit HU and the master cylinder CM are integrated. In addition, in the braking control device SC, a so-called front-rear type (also referred to as "type II") brake system is adopted. The fluid unit HU includes an application unit AU including the master cylinder CM and a pressurizing unit KU.

The application unit AU and the pressurizing unit KU are controlled by the braking controller ECU. Specifically, the braking operation amount Ba (at least one of the simulator fluid pressure Ps, the operation displacement Sp, and the operation force Fp), the target deceleration Gd, the first and the second adjusted fluid pressures Pa and Pb, and the maximum front and rear wheel regenerative braking forces Fxf and Fxr are input to the controller ECU. Then, based on these signals, the driving signals Va and Vb of the first and the second on-off valves VA and VB, the driving signals Ua and Ub of the first and the second pressure adjusting valves UA and UB, the driving signal Ma of the electric motor MA, and the front wheel and rear wheel target regenerative braking forces Fhf and Fhr are calculated. The electromagnetic valves "VA, VB, UA, UB" constituting the fluid unit HU and the electric motor MA are controlled (driven) according to the driving signal "Va, Vb, Ua, Ub, Ma".

As described later, the fluid unit HU, the wheel cylinder CW, and the like are connected by a reservoir passage HR, a communication passage HS (=HSf, HSr), an input passage HN, a servo passage HV, and a reflux passage HK. These form a fluid passage through which the brake fluid BF is moved. The fluid passage (HS or the like) corresponds to fluid pipes, flow passages in the fluid unit HU, hoses, or the like.

<<Application Unit AU>>

The application unit AU includes a master reservoir RV, a master cylinder CM, a master piston NP, a master spring DP, an input cylinder CN, an input piston NN, an input spring DN, first and second on-off valves VA and VB, a stroke simulator SS, and a simulator fluid pressure sensor PS.

The master reservoir (also referred to as "atmospheric pressure reservoir") RV is a tank for operation fluid, and the brake fluid BF is stored therein. The master reservoir RV is connected to the master cylinder CM (in particular, the master chamber Rm).

The master cylinder CM is a cylinder member having a bottom portion. The master piston NP is inserted into the master cylinder CM, and the inside of the master cylinder CM is sealed by a sealing member SL to form a master chamber Rm. The master cylinder CM is a so-called single type. A master spring DP is provided in the master chamber Rm so as to push the master piston NP in a backward direction Hb (a direction in which the volume of the master chamber Rm increases, opposite to a forward direction Ha). The master chamber Rm is finally connected to the front wheel cylinder CWf via a front wheel communication passage HSf and a fluid pressure modulator MJ. When the master piston NP is moved in the forward direction Ha (direction in which the volume of the master chamber Rm decreases), the brake fluid BF is pumped at the fluid pressure Pm from the fluid unit HU (in particular, the master cylinder CM) toward the front wheel cylinder CWf. The fluid pressure Pm of the master chamber Rm is called "master fluid pressure".

The master piston NP includes a collar (flange) Tp. The collar Tp further partitions the inside of the master cylinder CM into a servo chamber Ru and a rear chamber Ro. The servo chamber Ru is disposed to face the master chamber Rm intermediated by the master piston NP. In addition, the rear chamber Ro is sandwiched between the master chamber Rm and the servo chamber Ru, and is disposed therebetween. The servo chamber Ru and the rear chamber Ro are also sealed by the seal member SL in the same manner as described above.

For example, the pressure receiving area (that is, the pressure receiving area of the servo chamber Ru) ru of the collar Tp of the master piston NP and the pressure receiving area (that is, the pressure receiving area of the master chamber Rm) rm of the end portion of the master piston NP are set to be equal to each other. In this case, the fluid pressure Pa (to be described later) of the servo chamber Ru and the fluid pressure Pm (master fluid pressure) of the master chamber Rm become equal.

The input cylinder CN is fixed to the master cylinder CM. The input piston NN is inserted into the input cylinder CN, and sealed by a seal member SL to form an input chamber Rn. The input piston NN is mechanically connected to the braking operation member BP via a clevis (U-shaped link). The input piston NN includes a collar Tn. An input spring DN is provided between the collar Tn and the attachment surface of the input cylinder CN facing the master cylinder CM. The input piston NN is pushed in the backward direction Hb by the input spring DN.

In a state where the input piston NN and the master piston NP are pushed in the backward direction Hb to the innermost position, the input piston NN and the master piston NP have a gap Ks (also referred to as a "separation distance"). The gap Ks forms a state in which the brake fluid pressure Pw does not change when the displacement Sp of the braking operation member BP occurs. In other words, since the input piston NN and the master piston NP are separated from each other with the gap Ks, a brake-by-wire configuration can be applied to the braking control device SC, and the regenerative coordination control can be achieved.

The application unit AU includes the following fluid pressure chambers: the input chamber Rn, the servo chamber Ru, the rear chamber Ro, and the master chamber Rm. Here, the "fluid pressure chamber" is a chamber filled with the brake fluid BF and sealed by the seal member SL. The volumes of the respective fluid pressure chambers are changed by the movement of the input piston NN and the master piston NP. In the arrangement of the fluid pressure chamber, the input chamber Rn, the servo chamber Ru, the rear chamber Ro, and the master chamber Rm are arranged in this order from the side closer to the braking operation member BP along the central axis line Jm of the master cylinder CM.

The input chamber Rn and the rear chamber Ro are connected via an input passage HN. Then, the input passage HN includes a first on-off valve VA. The input passage HN is connected to the master reservoir RV via the reservoir passage HR between the rear chamber Ro and the first on-off valve VA. The reservoir passage HR includes a second on-off valve VB. The first and the second on-off valves VA and VB are two-position electromagnetic valves (also referred to as "on-off valves") having an open position (communication state) and a closed position (cutoff state). A normally closed electromagnetic valve is adopted as the first on-off valve VA. A normally open electromagnetic valve is adopted as the second on-off valve VB. Note that, the first and the second on-off valves VA and VB are driven (controlled) by driving signals Va and Vb from the braking controller ECU.

A stroke simulator (also simply referred to as a "simulator") SS is connected to the rear chamber Ro. Operation force Fp of the braking operation member BP is generated by the simulator SS. A piston and an elastic body (For example, a compression spring) are included inside the simulator SS. When the brake fluid BF flows into the simulator SS, the piston is pushed by the brake fluid BF. Since a force is applied to the piston in a direction in which the inflow of the brake fluid BF is blocked by the elastic body, the operation force Fp of the braking operation member BP is generated. The operation characteristic (relationship between the operation displacement Sp and the operation force Fp) of the braking operation member BP is formed by the simulator SS.

The simulator fluid pressure sensor PS is provided to detect the fluid pressure (the simulator fluid pressure, as well as the fluid pressure of the input chamber Rn and the rear chamber Ro) Ps of the simulator SS. The simulator fluid pressure sensor PS is one of the above-described braking operation amount sensors BA. The simulator fluid pressure Ps is input to the controller ECU for braking as the braking operation amount Ba.

As the braking operation amount sensor BA, besides the simulator fluid pressure sensor PS, the fluid unit HU further includes an operation displacement sensor SP that detects an operation displacement Sp of the braking operation member BP, and/or an operation force sensor FP that detects an operation force Fp of the braking operation member BP. That is, at least one of the simulator fluid pressure sensor PS, the operation displacement sensor SP (stroke sensor), and the operation force sensor FP are adopted as the braking operation amount sensor BA. Therefore, the braking operation amount Ba is at least one of the simulator fluid pressure Ps, the operation displacement Sp, and the operation force Fp.

<<Pressurizing Unit KU>>

The fluid pressure Pwf of the front wheel cylinder CWf and the fluid pressure Pwr of the rear wheel cylinder CWr are independently and individually adjusted by the pressurizing unit KU. Here, with respect to the magnitude relationship between the front wheel brake fluid pressure Pwf and the rear wheel brake fluid pressure Pwr, the front wheel brake fluid pressure Pwf is equal to or less than the rear wheel brake fluid pressure Pwr. The pressurizing unit KU includes an electric motor MA, a fluid pump QA, first and second pressure adjusting valves UA and UB, and first and second adjusted fluid pressure sensors PA and PB.

An electric pump includes one electric motor MA and one fluid pump QA. The fluid pump QA is driven by the electric motor MA, and the brake fluid pressure Pw is increased by the brake fluid BF discharged from the fluid pump QA. Therefore, the electric motor MA is a power source for increasing the fluid pressure (brake fluid pressure) Pw of the wheel cylinder CW. The electric motor MA is controlled by the braking controller ECU according to a driving signal Ma.

The suction unit of the fluid pump QA is connected to the master reservoir RV via the reservoir passage HR. In addition, the suction unit and the discharge unit of the fluid pump QA are connected via a reflux passage HK. Therefore, when the electric motor MA is driven, the circulation flow KN (indicated by a dashed line arrow in the drawing and also simply referred to as "reflux") of the brake fluid BF is generated in the reflux passage HK by the brake fluid BF discharged from the fluid pump QA. Here, in the reflux KN, a side close to the discharge portion of the fluid pump QA is referred to as an "upstream side", and a side far from the discharge portion is referred to as a "downstream side".

The reflux passage HK includes two pressure adjusting valves UA and UB in series. Specifically, a first pressure adjusting valve UA is provided in the reflux passage HK. Then, a second pressure adjusting valve UB is provided between the first pressure adjusting valve UA and the discharge unit of the fluid pump QA. Therefore, in the reflux KN, the second pressure adjusting valve UB is disposed on the upstream side with respect to the first pressure adjusting valve UA. The first and the second pressure adjusting valves UA and UB are linear type electromagnetic valves (also referred to as "proportional valve" or "differential pressure valve") in which a valve opening amount (lift amount) is continuously controlled based on an energized state (for example, supply current). A normally open electromagnetic valve is adopted as the first and the second pressure adjusting valves UA and UB. The first and the second pressure adjusting valves UA and UB are controlled by the braking controller ECU based on the driving signals Ua and Ub.

When the electric motor MA is driven and the fluid pump QA is operated, the brake fluid BF is circulated in the order of "QA→UB→UA→QA". When the first and the second pressure adjusting valves UA and UB are not supplied with electric power and are in the fully open state, both the fluid pressures Pa and Pb in the reflux passage HK are substantially "0 (atmospheric pressure)" (that is, "Ia=Ib=0, Pa=Pb=0"). In a state where the second pressure adjusting valve UB is not energized, power starts to be supplied to the first pressure adjusting valve UA, and when the energization amount Ia is increased, the reflux KN is narrowed by the first pressure adjusting valve UA. As a result, the fluid pressure Pa (referred to as "first adjusted fluid pressure") between the fluid pump QA and the first pressure adjusting valve UA is increased from "0".

In this state, power starts to be supplied to the second pressure adjusting valve UB, and when the energization amount Ib is increased, the reflux KN is further narrowed by the second pressure adjusting valve UB. As a result, the fluid pressure Pb (referred to as "second adjusted fluid pressure") between the discharge unit of the fluid pump QA and the second pressure adjusting valve UB is increased from the first adjusted fluid pressure Pa. Therefore, with respect to the magnitude relationship between the first adjusted fluid pressure Pa and the second adjusted fluid pressure Pb, the second adjusted fluid pressure Pb is always equal to or larger than the first adjusted fluid pressure Pa (that is, "Pb≥Pa"). When power is not supplied to the second pressure adjusting valve UB and the second pressure adjusting valve UB is in the fully open state, the first adjusted fluid pressure Pa and the second adjusted fluid pressure Pb are equal (that is, "Pa=Pb" at "Ib=0").

The reflux passage HK is connected to the servo chamber Ru through the servo passage HV between the first pressure adjusting valve UA and the second pressure adjusting valve UB. Therefore, the first adjusted fluid pressure Pa is supplied to the servo chamber Ru. Then, since the pressure receiving area ru of the servo chamber Ru and the pressure receiving area rm of the master chamber Rm are the same, the master fluid pressure Pm (resultantly, the front wheel brake fluid pressure Pwf) is equal to the first adjusted fluid pressure Pa. In other words, the first adjusted fluid pressure Pa is supplied to the front wheel cylinder CWf. In addition, the reflux passage HK is connected to the rear wheel cylinder CWr via the rear wheel connection passage HSr and the fluid pressure modulator MJ between the fluid pump QA (in particular, the discharge portion) and the second pressure adjusting valve UB. Therefore, the second adjusted fluid pressure Pb is supplied to the rear wheel cylinder CWr. The pressurizing unit KU includes first and second adjusted fluid pressure sensors PA and PB to detect the first and the second adjusted fluid pressures Pa and Pb.

The fluid pressure modulator MJ is provided between the braking control device SC and the front and rear wheel cylinders CWf and CWr so that the front and rear wheel brake fluid pressures Pwf and Pwr can be individually controlled in each wheel cylinder CW. Inside the fluid pressure modulator MJ, the front and rear wheel communication passages HSf and HSr are respectively branched into two and connected to the front and rear wheel cylinders CWf and CWr. The fluid pressure modulator MJ independently and individually controls the fluid pressure Pw of each wheel cylinder CW such as the anti-lock brake control and the vehicle stability control. Note that, in the regenerative coordination control (to be described later), the fluid pressure modulator MJ is not operated.

<<Operation of Fluid Unit HU>>

At the time of non-braking (that is, when the operation of the braking operation member BP is not performed), the pistons NN and NP are pressed by the springs DN and DP and returned to their initial positions (the innermost positions moved in the backward direction Hb). In this state, the master chamber Rm and the master reservoir RV are in a communicating state, and the master fluid pressure Pm of the master chamber Rm is "0 (atmospheric pressure)". In addition, at the initial positions of the pistons NN and NP, the input piston NN and the master piston NP have a gap Ks. Since the first and the second pressure adjusting valves UA and UB are open at the time of non-braking, the first and the second adjusted fluid pressures Pa and Pb are "0 (atmospheric pressure)".

At the time of braking (that is, when the braking operation member BP is operated), the first on-off valve VA is open, and the second on-off valve VB is closed. That is, the input chamber Rn and the rear chamber Ro are in the communicating state, and the communicating state between the rear chamber Ro and the master reservoir RV is cut off to be in the non-communicating state. As the operation amount Ba of the braking operation member BP increases, the input piston NN is moved in the forward direction Ha, and the brake fluid BF is discharged from the input chamber Rn. Since the brake fluid BF is sucked into the stroke simulator SS, the fluid pressure Pn (input fluid pressure) in the input chamber Rn and the fluid pressure Po (rear fluid pressure) in the rear chamber Ro are increased, and the operation force Fp is generated in the braking operation member BP. At this time, according to the braking operation amount Ba (at least one of the simulator fluid pressure Ps, the operation displacement Sp, and the operation force Fp), the first and the second pressure adjusting valves UA and UB are controlled, and the first and the second adjusted fluid pressures Pa and Pb are increased.

Since the first adjusted fluid pressure Pa is supplied to the servo chamber Ru, the master piston NP is pressed and moved in the forward direction Ha. As the master piston NP moves in the forward direction Ha, the master fluid pressure Pm is increased. Then, the brake fluid BF adjusted to the master fluid pressure Pm is supplied to the front wheel cylinder CWf, and the internal pressure (brake fluid pressure) Pwf is increased. In addition, the brake fluid BF adjusted to the second adjusted fluid pressure Pb is supplied to the rear wheel cylinder CWr, and the internal pressure (brake fluid pressure) Pwr is increased. That is, the front wheel brake fluid pressure Pwf is adjusted to be equal to the first adjusted fluid pressure Pa, and the rear wheel brake fluid pressure Pwr is adjusted to be equal to the second adjusted fluid pressure Pb. At this time, due to the restriction of the fluid unit HU (in particular, the pressurizing unit KU), the front wheel brake fluid pressure Pwf (=Pa) can be adjusted within a range of being equal to or less than the rear wheel brake fluid pressure Pwr (=Pb).

The braking control device SC is a brake-by-wire type, and performs regenerative coordination control. Since the input piston NN and the master piston NP have the gap Ks, the relative positional relationship between the input piston NN and the master piston NP can be arbitrarily adjusted within the range of the gap Ks by controlling the first adjusted fluid pressure Pa. For example, when only the braking force Fgf by the front wheel regenerative braking device KCf is required, "Pa=0" is set, and the master fluid pressure Pm is kept at "0". Since the front wheel brake fluid pressure Pwf is not increased and remains at "0", the braking force (front wheel friction braking force) Fmf due to the friction between the rotating member KT and the friction member MS is not generated. Therefore, the front wheel braking force Fbf is generated only by the front wheel regenerative braking force Fgf.

<Processing of Regenerative Coordination Control>

The processing of the regenerative coordination control according to the first embodiment will be described with reference to the flowchart of FIG. 3. The "regenerative coordination control" is to coordinate and control the regenerative braking force Fg by the generator GN and the friction braking force Fm by the braking control device SC so that kinetic energy of the vehicle JV is efficiently recovered (regenerated) as electric energy at the time of braking. The algorithm of the regenerative coordination control is programmed in the microprocessor MP of the braking controller ECU.

In the first embodiment, comparing to the regenerative capacity of the rear wheel regenerative braking device KCr, the regenerative capacity of the front wheel regenerative braking device KCf is relatively larger. That is, in the regenerative braking, the front wheel regenerative braking device KCf is dominant. Therefore, in the regenerative coordination control, the regenerative braking force Fg and the friction braking force Fm can be adjusted individually between the front and rear wheels, but there is a restriction of "Pwf≤Pwr".

In step S110, signals such as the braking operation amount Ba, the first and the second adjusted fluid pressures Pa and Pb, the vehicle body speed Vx, and the target deceleration Gd are loaded. The operation amount Ba is calculated based on the detection value of the operation amount sensor BA (simulator fluid pressure sensor PS, operation displacement sensor SP, operation force sensor FP, and the like). The first and the second adjusted fluid pressures Pa and Pb are calculated based on a detection value of first and second adjusted fluid pressure sensors PA and PB provided in the fluid unit HU. The vehicle body speed Vx is calculated based on the wheel speed Vw (detection value of the wheel speed sensor VW). The target deceleration Gd is transmitted from the driving assistance controller ECA.

In step S120, the target vehicle body braking force Fv is calculated based on the braking operation amount Ba. The "target vehicle body braking force Fv" is a target value corresponding to the braking force Fb acting on the vehicle body (that is, the braking force of the vehicle JV as a whole). The target vehicle body braking force Fv is calculated as "0" when the braking operation amount Ba is less than a predetermined amount bo based on the braking operation amount Ba and a calculation map Zfv. Then, when the braking operation amount Ba is equal to or higher than the predetermined amount bo, the target vehicle body braking force Fv is calculated as increasing from "0" along with the increase of the braking operation amount Ba from "0". Here, the predetermined amount bo is a predetermined default value (constant) representing a play of the braking operation member BP.

When the braking is automatically performed by the driving assistance device UC (that is, in the case of automatic braking control independent of the operation of the braking operation member BP), the target vehicle body braking force Fv is calculated based on the target deceleration Gd in step S120 as in the case of the braking operation amount Ba. Specifically, the target vehicle body braking force Fv is calculated as "0" when "Gd<bo", and is calculated as increasing from "0" along with the increase in the target deceleration Gd when "Gd≥bo". Here, the predetermined amount bo is a predetermined default value (constant) representing a dead zone in the automatic braking control.

In step S130, the front and rear wheel required braking forces Fqf and Fqr (=Fq) are calculated based on the target vehicle body braking force Fv. The "front and rear wheel required braking forces Fqf, Fqr" are target values corresponding to the actual front and rear wheel braking forces Fbf and Fbr acting on the front wheel WHf and the rear wheel WHr. Therefore, the braking force requirement Fq is a target value corresponding to the sum of the regenerative braking force Fg and the friction braking force Fm. Since the braking forces of the left and right wheels are calculated as the same value in the braking control device SC, the front wheel required braking force Fqf corresponds to the amount of two wheels in the front of the vehicle (that is, the front two wheels WHf), and the rear wheel required braking force Fqr corresponds to the amount of two wheels in the rear of the vehicle (that is, the rear two wheels WHr). In step S130, the front and rear wheel required braking forces Fqf and Fqr are calculated so that the following two conditions are satisfied.

Condition 1: A sum of the front wheel required braking force Fqf and the rear wheel required braking force Fqr matches the target vehicle body braking force Fv (that is, "Fv=Fqf+Fqr").

Condition 2: The ratio Kq of the rear wheel required braking force Fqr to the front wheel required braking force Fqf is constant (value hb) (that is, "Kq=Fqr/Fqf=hb, where hb is a predetermined default value (constant)").

Specifically, in step S130, assuming the ratio Kq as "hb (constant value)", the front and rear wheel required braking forces Fqf and Fqr are calculated as in the following equation (1).

$$Fqf = Fv/(1+hb), \text{ and } Fqr = Fv \cdot hb/(1+hb) \qquad \text{Equation (1)}$$

In step S140, the maximum front and rear wheel regenerative braking forces Fxf and Fxr (=Fx) are acquired. The "maximum regenerative braking force Fx" is the maximum value (limit value) of the front and rear wheel regenerative braking forces Fgf and Fgr that can be generated by the front and rear wheel regenerative braking devices KCf and KCr (=KC). In other words, the maximum regenerative braking force Fx is a state quantity representing the limit of the regenerative braking force Fg.

The maximum regenerative braking force Fx is restricted by the operation state of the regenerative braking device KC. Therefore, the maximum regenerative braking force Fx is determined based on the operation state of the regenerative braking device KC. Specifically, the operation state of the regenerative braking device KC corresponds to at least one of the rotational speed Ng of the generator GN (that is, the front and rear wheel rotational speeds Ngf and Ngr), the state (temperature or the like) of the regenerative controller EG (in particular, a power transistor such as an IGBT), and the state of the storage battery BT (charge reception amount, temperature, or the like). The maximum regenerative braking force Fx is calculated (determined) by the regenerative controller EG and acquired by the braking controller ECU via the communication bus BS. For example, in the regeneration controller EG, the maximum regenerative braking force Fx is determined by the following method.

The maximum front wheel regenerative braking force Fxf (upper limit value of the front wheel regenerative braking force) is determined based on a characteristic Zxf (calculation map) in the upper stage of a block X140. This is because the regeneration amount (resultantly, regenerative braking force) by the regenerative braking device KC is determined by the rating of the power transistor (IGBT or the like) of the regeneration controller EG and the charge acceptance amount of the storage battery BT (the remaining amount obtained by subtracting the current charge amount from the full charge amount). Specifically, in the calculation map Zxf, when the rotation speed Ngf of the front wheel generator GNf (also simply referred to as "front wheel rotation speed")

is equal to or higher than a first front wheel predetermined speed vp, the maximum regenerative braking force Fx is determined so that the regenerative power (power) of the front wheel regenerative braking device KCf is constant (that is, the product of the maximum regenerative braking force Fx and the front wheel rotation speed Ngf is constant). Therefore, when "Ngf≥vp", the maximum regenerative braking force Fx is calculated as increasing in an inversely proportional relationship with respect to the rotation speed Ngf as the front wheel rotation speed Ngf decreases. In addition, since the regeneration amount decreases when the front wheel rotation speed Ngf decreases, in the calculation map Zxf, when the front wheel rotation speed Ngf is less than a second front wheel predetermined speed vo, the maximum front wheel regenerative braking force Fxf is calculated as decreasing along with the decrease of the rotation speed Ngf. Furthermore, a predetermined front wheel upper limit value fxf is provided in the calculation map Zxf so that an excessive deceleration slip (in extreme cases, wheel lock) does not occur in the front wheel WHf by the front wheel regenerative braking force Fgf. Note that, the first front wheel predetermined speed vp, the second front wheel predetermined speed vo, and the front wheel upper limit value fxf are predetermined default values (constants).

Similarly as the maximum front wheel regenerative braking force Fxf, maximum rear wheel regenerative braking force Fxr (upper limit value of the rear wheel regenerative braking force) is determined based on the characteristic Zxr (calculation map) in the lower stage of the block X140. Specifically, in the calculation map Zxr, when the rotation speed Ngr of the rear wheel generator GNr (also simply referred to as "rear wheel rotation speed") is equal to or higher than a first rear wheel predetermined speed up, the maximum regenerative braking force Fx is determined so that the regenerative power (power) of the rear wheel regenerative braking device KCr is constant (that is, the product of the maximum regenerative braking force Fx and the rear wheel rotation speed Ngr is constant). Therefore, when "Ngr≥up", the maximum regenerative braking force Fx is calculated as increasing in an inversely proportional relationship with respect to the rotation speed Ngr as the rear wheel rotation speed Ngr decreases. In addition, since the regeneration amount decreases when the rear wheel rotation speed Ngr decreases, in the calculation map Zxr, when the rear wheel rotation speed Ngr is less than a second rear wheel predetermined speed uo, maximum rear wheel regenerative braking force Fxr is calculated as decreasing along with the decrease of the rotation speed Ngr. Furthermore, a predetermined rear wheel upper limit value fxr is provided in the calculation map Zxr so that an excessive deceleration slip (in extreme cases, wheel lock) does not occur in the rear wheel WHr by the rear wheel regenerative braking force Fgr. Note that, the first rear wheel predetermined speed up, the second rear wheel predetermined speed uo, and the rear wheel upper limit value fxr are predetermined default values (constants).

The method for determining the maximum front and rear wheel regenerative braking forces Fxf and Fxr (=Fx) based on the front and rear wheel rotation speeds Ngf and Ngr (=Ng) in each generator GN has been described above. Further, the maximum regenerative braking force Fx is determined based on the state, such as temperature, of the regenerative controller EG. When the temperature of the regeneration controller EG is high, the maximum regenerative braking force Fx is determined to further decrease from the maximum regenerative braking force Fx determined according to the rotation speed Ng. In addition, when the temperature of the storage battery BT is high, the maximum regenerative braking force Fx is calculated as decreasing.

In step S150, the rear wheel reference regenerative braking force Fkr is calculated based on the maximum front wheel regenerative braking force Fxf. The "rear wheel reference regenerative braking force Fkr" is a state variable for restricting the rear wheel target regenerative braking force Fhr (resultantly, the rear wheel regenerative braking force Fgr) so that the ratio Kq of the rear wheel required braking force Fqr to the front wheel required braking force Fqf is maintained at a constant value hb when the maximum front wheel regenerative braking force Fxf decreases due to disorder (for example, the temperature rise in the front wheel regeneration controller EGf) of the front wheel regenerative braking device KCf. Specifically, the maximum front wheel regenerative braking force Fxf is multiplied by the constant value hb (preset constant) to calculate the rear wheel restricted regenerative braking force Fsr (that is, "Fsr=hb·Fxf"). Then, in step S150, the smaller one of the maximum rear wheel regenerative braking force Fxr and the rear wheel restricted regenerative braking force Fsr is determined as the rear wheel reference regenerative braking force Fkr (that is, "Fkr=MIN (Fxr, Fsr)"). For example, when the front wheel regenerative braking device KCf completely fails, the maximum front wheel regenerative braking force Fxf is "0", and therefore, the rear wheel reference regenerative braking force Fkr is calculated as "0" (That is, "Fxf=0, Fkr=0").

In step S160, the front and rear wheel target regenerative braking forces Fhf and Fhr and the front and rear wheel target friction braking forces Fnf and Fnr are calculated based on the front and rear wheel required braking forces Fqf and Fqr, the maximum front wheel regenerative braking force Fxf and the rear wheel reference regenerative braking force Fkr. The "front and rear wheel target regenerative braking forces Fhf and Fhr (=Fh)" are target values corresponding to the actual front and rear wheel regenerative braking forces Fgf and Fgr (=Fg) to be achieved by the front and rear wheel regenerative braking devices KCf and KCr. In addition, the "front and rear wheel target friction braking forces Fnf and Fnr (=Fn)" are target values corresponding to the actual front and rear wheel frictional braking forces Fmf and Fmr (=Fm) to be achieved by the braking control device SC.

In step S160, "whether or not the front wheel required braking force Fqf is larger than the maximum front wheel regenerative braking force Fxf (referred to as "front wheel limit determination")" is determined. When the front wheel required braking force Fqf is equal to or less than the maximum front wheel regenerative braking force Fxf (that is, when "Fqf≤Fxf" and the front wheel limit determination is negative), the front wheel target regenerative braking force Fhf is calculated as the front wheel required braking force Fqf, and the front wheel target friction braking force Fnf is calculated as "0" (that is, "Fhf=Fqf, Fnf=0"). On the other hand, when the front wheel required braking force Fqf is larger than the maximum front wheel regenerative braking force Fxf (that is, when "Fqf>Fxf" and the front wheel limit determination is affirmative), the front wheel target regenerative braking force Fhf is calculated as the maximum front wheel regenerative braking force Fxf, and the front wheel target friction braking force Fnf is calculated as a value subtracting the maximum front wheel regenerative braking force Fxf from the front wheel required braking force Fqf (that is, "Fhf=Fxf, Fnf=Fqf−Fxf").

In addition, in step S160, "whether or not the rear wheel required braking force Fqr is larger than the rear wheel reference regenerative braking force Fkr (referred to as "rear wheel limit determination")" is determined. When the rear wheel required braking force Fqr is equal to or less than the rear wheel reference regenerative braking force Fkr (that is, when "Fqr≤Fkr" and the rear wheel limit determination is negative), the rear wheel target regenerative braking force Fhr is calculated as the rear wheel required braking force Fqr, and the rear wheel target friction braking force Fnr is calculated as "0" (that is, "Fhr=Fqr, Fnr=0"). On the other hand, when the rear wheel required braking force Fqr is larger than the rear wheel reference regenerative braking force Fkr (that is, when "Fqr>Fkr" and the rear wheel limit determination is affirmative), the rear wheel target regenerative braking force Fhr is calculated as the rear wheel reference regenerative braking force Fkr, and the rear wheel target friction braking force Fnr is calculated as a value subtracting the rear wheel reference regenerative braking force Fkr from the rear wheel required braking force Fqr (that is, "Fhr=Fkr, Fnr=Fqr−Fkr"). The front wheel limit determination and the rear wheel limit determination are individually performed respectively.

The front and rear wheel target regenerative braking force Fhf and Fhr calculated in the step S160 are transmitted from the braking controller ECU to the front and rear wheel regenerative controller EGf and EGr. Then, the front and rear wheel generators GNf and GNr are controlled by the front and rear wheel regenerative controllers EGf and EGr so that the actual front and rear wheel regenerative braking forces Fgf and Fgr approach and match the front and rear wheel target regenerative braking forces Fhf and Fhr. Note that, when the front wheel regenerative braking device KCf fails, both the front wheel and rear wheel target regenerative braking forces Fhf and Fhr are determined as "0", and therefore, the front and rear wheel regenerative braking forces Fgf and Fgr are not generated.

In step S170, the front and rear wheel target fluid pressures Ptf and Ptr are calculated based on the front and rear wheel target friction braking forces Fnf and Fnr. The "font/rear wheel target fluid pressures Ptf, Ptr (=Pt)" are target values corresponding to the actual front and rear wheel brake fluid pressures Pwf, Pwr (=Pw). Specifically, the target friction braking force Fn is converted to the target fluid pressure Pt based on the specifications (pressure receiving area of wheel cylinder CW, effective braking radius of rotating member KT, friction coefficient of friction member MS, effective radius of wheel (tire), and the like) of the braking device SX and the like.

In step S180, the front and rear wheel brake fluid pressures Pwf and Pwr (actual values) are adjusted based on the front and rear wheel target fluid pressures Ptf and Ptr (target value). The electromagnetic valve and the electric motor constituting the fluid unit HU are driven by the braking controller ECU, and the actual front and rear wheel brake fluid pressures Pwf and Pwr are controlled to approach and match the front and rear wheel target fluid pressures Ptf and Ptr.

The braking control device SC can separately control the front and rear wheel regenerative braking forces Fgf and Fgr between the front and rear wheels via the front and rear wheel regenerative braking devices KCf and KCr (in particular, the front and rear wheel generators GNf and GNr). In addition, the braking control device SC can separately control the brake fluid pressure Pw by the wheel cylinders CWf and CWr of the front and rear wheels. That is, the braking control device SC can separately control the front and rear wheel frictional braking forces Fmf and Fmr between the front and rear wheels. However, the braking control device SC has a constraint that the adjustment of the front wheel brake fluid pressure Pwf (=Pa) is equal to or less than the rear wheel brake fluid pressure Pwr (=Pb).

In the regenerative coordination control of the braking control device SC, the front and rear wheel regenerative braking forces Fgf and Fgr and the front and rear wheel frictional braking forces Fmf and Fmr are adjusted so that the ratio Kq of the rear wheel required braking force Fqr to the front wheel required braking force Fqf is always constant (value hb). As a result, the ratio Kb of the rear wheel braking force Fbr to the front wheel braking force Fbf is always constant (value hb) when the front and rear wheel regenerative braking devices KCf, KCr fall into disorder. Since the front and rear wheel braking force distribution is always optimized, the directional stability of the vehicle is improved during regenerative braking.

Note that, in the first embodiment, when the rear wheel regenerative braking device KCr falls into disorder, the restriction (that is, the condition of "Pwf≤Pwr") of the fluid unit HU does not affect the regenerative coordination control. In other words, when the generation of the rear wheel regenerative braking force Fgr by the rear wheel regenerative braking device KCr decreases, the ratio Kb of the braking force distribution can be maintained at the constant value hb without limiting the generation of the front wheel regenerative braking force Fgf. That is, although the maximum rear wheel regenerative braking force Fxr may decrease due to disorder of the rear wheel regenerative braking device KCr, the regeneration amount (that is, the front wheel regenerative braking force Fgf) of the front wheel regenerative braking device KCf is not intentionally limited in order to maintain the braking force distribution ratio Kb (=Fbr/Fbf) at the constant value hb. In summary, when the rear wheel regenerative braking device KCr completely fails and the rear wheel regenerative braking force Fgr cannot be generated at all, the generation of the front wheel regenerative braking force Fgf is permitted, but when the front wheel regenerative braking device KCf completely fails and the front wheel regenerative braking force Fgf cannot be generated at all, the generation of the rear wheel regenerative braking force Fgr is prohibited.

<Front and Rear Wheel Braking Force Distribution at the Start of Braking in Regenerative Coordination Control According to First Embodiment>

The front and rear wheel braking force distribution in the regenerative coordination control at the start of braking in the first embodiment will be described with reference to the characteristic diagram of FIGS. 4(*a*) and (*b*). In the regenerative coordination control, a target value is calculated, and the actual value is controlled to match the target value. In the characteristic diagram, actual front and rear wheel braking forces Fbf and Fbr are illustrated as the control results of the front and rear wheel required braking forces Fqf and Fqr.

First, various state amounts related to the braking force will be organized. The target value of the braking force acting on the entirety of the vehicle is the target vehicle body braking force Fv, and the actual value resulted in the control is the braking force Fb. Since the actual value Fb is generated on the front and rear wheels, the actual value related to the front wheel WHf (for two wheels) is the front wheel braking force Fbf, and the actual value related to the rear wheel WHr (for two wheels) is the rear wheel braking force Fbr. The target vehicle body braking force Fv is distributed to the braking forces of the front and rear wheels as the front and rear wheel required braking forces Fqf and Fqr. Therefore, the control results corresponding to the target values Fqf and Fqr are the actual front and rear wheel braking forces Fbf and Fbr. Furthermore, in the ratio of the rear wheel braking force to the front wheel braking force (also referred to as "distribution ratio"), the target value is the ratio Kq (=Fqr/Fqf), and the actual value is the ratio Kb (=Fbr/Fbf). Since the actual value is controlled to match the target value, the distribution ratio Kq and the distribution ratio Kb are substantially equal to each other and have a constant value hb (that is, "Kq=Kb=hb").

The front and rear wheel required braking forces (target values) Fqf and Fqr are divided into target values by regenerative braking (target regenerative braking force) Fhf and Fhr and target values by friction braking (target friction braking force) (for example, braking by the frictional force when the friction member MS is pressed against the rotating member KT at the brake fluid pressure Pw) Fnf and Fnr. The control results corresponding to the target values Fhf and Fhr are the actual values Fgf and Fgr, and the control results corresponding to the target values Fnf and Fnr are the actual values Fmf and Fmr. Therefore, the target values have a relationship of "Fv=Fqf+Fqr, Fqf=Fhf+Fnf, Fqr=Fhr+Fnr", and the actual values have a relationship of "Fb=Fbf+Fbr, Fbf=Fgf+Fmf, Fbr=Fgr+Fmr".

Figure 3:
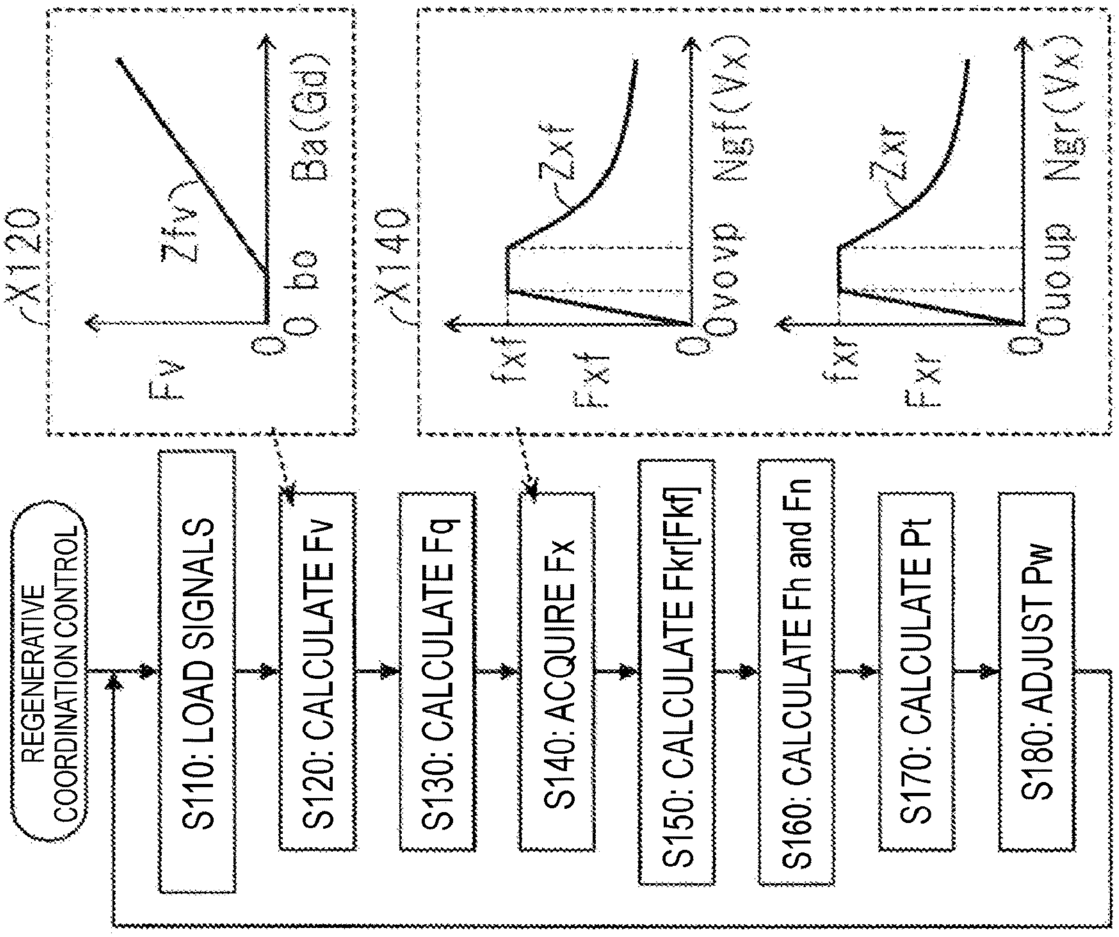
FIG. 3 is a flowchart for describing a process of regenerative coordination control.
Figure 4A:
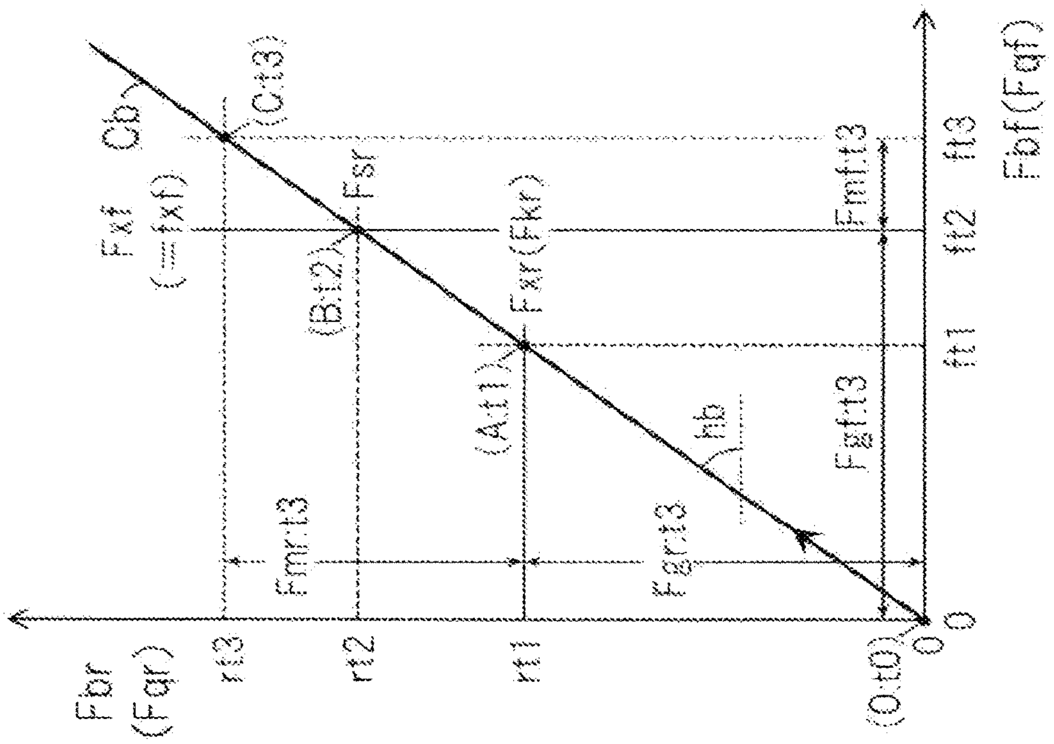
FIG. 4 is a characteristic diagram for describing the front and rear wheel braking force distribution at the start of braking in the first embodiment.
Figure 4B:
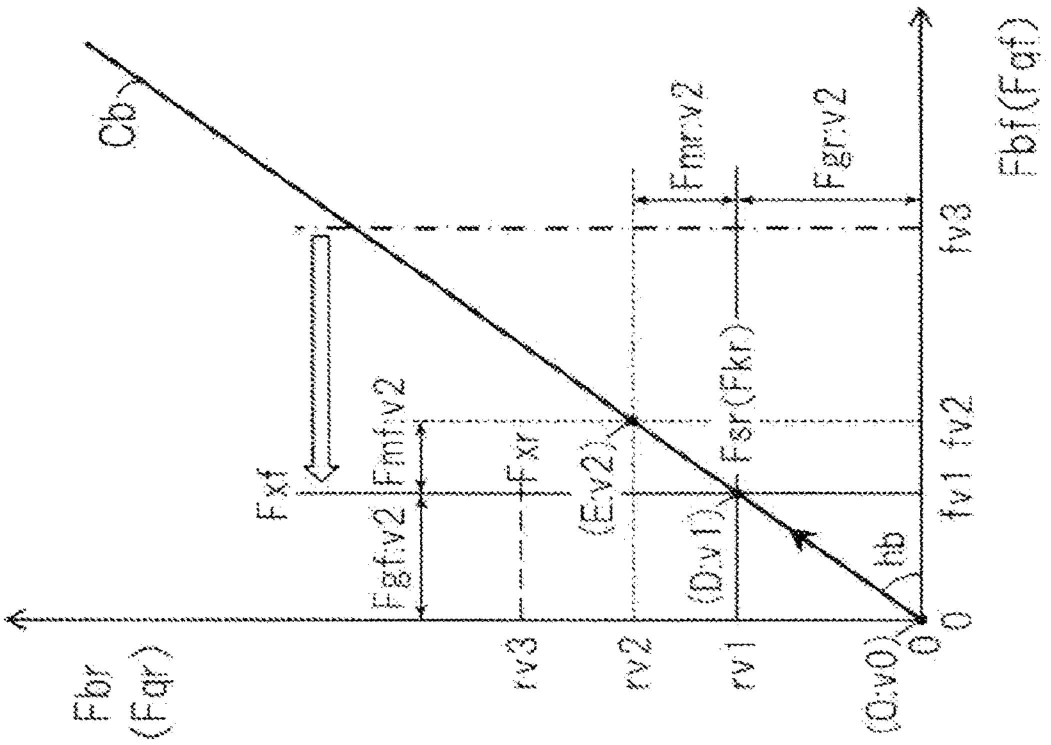

In the characteristic diagrams of FIGS. 4(*a*) and (*b*) (diagram representing the relationship of the rear wheel braking force Fbr with respect to the front wheel braking force Fbf), a situation in which the braking force is increased from the non-braking state is assumed. FIG. 4 (*a*) indicates a case where both the front and rear wheel regenerative braking devices KCf and KCr operate appropriately, and FIG. 4 (*b*) indicates a case where the front wheel regenerative braking device KCf falls into disorder and the regeneration amount decreases (that is, when the maximum front wheel regenerative braking force Fxf decreases). Although the maximum front and rear wheel regenerative braking forces Fxf and Fxr change according to the rotation speeds Ngf and Ngr of the front and rear wheel generators GNf and GNr, in consideration of complexity of description, a state in which both the maximum front and rear wheel regenerative braking forces Fxf and Fxr are limited to the front and rear wheel upper limit values fxf and fxr is illustrated in the calculation maps Zxf and Zxr (see the block X140) of FIG. 3. Here, the notation ":" in the drawing indicates a value at a corresponding time point. For example, "point (A:t1)" represents an operation point at the time point t1, and "Fmf:t3" represents a value of the front wheel friction braking force Fmf at the time point t3.

<<Case where Both the Front and Rear Wheel Regenerative Braking Devices KCf and KCr Operate Appropriately>>

The operation when both the front and rear wheel regenerative braking devices KCf and KCr are in an appropriate state will be described with reference to the characteristic diagram of FIG. 4 (*a*). In the regenerative coordination control in the braking control device SC, the regenerative braking force Fg and the friction braking force Fm are adjusted so that the actual front and rear wheel braking forces Fbf and Fbr follow the reference property Cb. Specifically, in the reference property Cb, the ratio Kb (that is, "Kb=Fbr/Fbf=Fqr/Fqf") of the rear wheel braking force Fbr to the front wheel braking force Fbf is set to a constant value hb. Therefore, in the characteristic diagram representing the relationship between the front wheel braking force Fbf and the rear wheel braking force Fbr, the reference property Cb is represented as a straight line passing through the original point (O) (a point where "Fbf=Fbr=0") and having an inclination hb (constant). Here, the inclination hb (a constant value) of the reference property Cb is set in advance on the basis of "pressure receiving area of front and rear wheel cylinders CWf, CWr", "effective braking radius of rotating members KTf, KTr", "friction coefficient of the friction material MS of front and rear wheels", and "effective radius of the wheel WH (tire)". For example, the reference property Cb is set to be smaller than a so-called ideal distribution characteristic within a range of normal braking (in the region of the braking force excluding a region where the maximum value of the braking force is generated) so that the rear wheel WHr does not fall into the locked state ahead of the front wheel WHf. Note that, in the region where the braking force reaches the maximum value, the braking force distribution control (so-called EBD control) is executed based on the wheel speed Vw so that the deceleration slip of the rear wheel WHr does not become larger than the deceleration slip of the front wheel WHf.

Hereinafter, the operation of the braking control device SC along with the transition of the time T (the order of "t0→t1→t2→t3") will be described. At the time point to, the operation of the braking operation member BP is started, and the braking operation amount Ba is increased from "0". Therefore, at the time point t0, the operation of the regenerative coordination control is started from the original point (O:t0). At the time point t1, as indicated by the operation point (A:t1), the rear wheel required braking force Fqr (resultantly, the rear wheel braking force Fbr) reaches the maximum rear wheel regenerative braking force Fxr. Furthermore, at the time point t2, as indicated by the operation point (B:t2), the front wheel required braking force Fqf (resultantly, the front wheel braking force Fbf) reaches the maximum front wheel regenerative braking force Fxf. That is, in the first embodiment, the regenerative capacity of the front wheel regenerative braking device KCf is relatively larger than the regenerative capacity of the rear wheel regenerative braking device KCr in the front and rear wheel regenerative braking devices KCf and KCr, and therefore, the rear wheel regenerative braking device KCr reaches the limit earlier than the front wheel regenerative braking device KCf.

The rear wheel restricted regenerative braking force Fsr is calculated based on the maximum front wheel regenerative braking force Fxf and the distribution ratio hb for each calculation cycle. Specifically, the maximum front wheel regenerative braking force Fxf is multiplied by the distribution ratio hb (constant) to calculate the rear wheel restricted regenerative braking force Fsr (that is, "Fsr=hb·Fxf"). Further, the maximum rear wheel regenerative braking force Fxr and the rear wheel restricted regenerative braking force Fsr are compared, and a smaller one of them is determined as the rear wheel reference regenerative braking force Fkr. When the front and rear wheel regenerative braking devices KCf, KCr operate appropriately, "Fxr<Fsr" is satisfied, and therefore, the maximum rear wheel regenerative braking force Fxr is determined as the rear wheel reference regenerative braking force Fkr (that is, "Fkr=Fxr").

Between the time point t0 and the time point t1 (that is, while the operation point transitions from the point (O:t0) to the point (A:t1)), the front wheel required braking force Fqf is equal to or less than the maximum front wheel regenerative braking force Fxf, and the rear wheel required braking force Fqr is equal to or less than the rear wheel reference regenerative braking force Fkr (=Fxr). Therefore, the front wheel target regenerative braking force Fhf is calculated as being equal to the front wheel required braking force Fqf, and the rear wheel target regenerative braking force Fhr is calculated as being equal to the rear wheel required braking force Fqr (that is, "Fhf=Fqf, Fhr=Fqr"). Since the friction braking is unnecessary, both the front and rear wheel target friction braking forces Fnf and Fnr are calculated as "0" (that is, "Fnf=Fnr=0"). As a result, the front and rear wheel frictional braking forces Fmf and Fmr are not generated, and the front and rear wheel required braking forces Fqf and Fqr are achieved (realized) only by the front and rear wheel regenerative braking forces Fgf and Fgr.

At time point t1, the rear wheel regenerative braking device KCr reaches the limit (that is, the maximum rear wheel regenerative braking force Fxr). Therefore, between the time point t1 and the time point t2 (that is, while the operation point transitions from the point (A:t1) to the point (B:t2)), the rear wheel required braking force Fqr is larger than the rear wheel reference regenerative braking force Fkr. Therefore, the rear wheel target regenerative braking force Fhr is calculated as being equal to the rear wheel reference regenerative braking force Fkr, and the rear wheel target friction braking force Fnr is increased from "0" so that the deficiency (that is, "Fqr−Fkr") of the rear wheel required braking force Fqr is complemented (that is, "Fhr=Fkr, Fnr=Fqr−Fkr"). The front wheel regenerative braking device KCf has not reached the limit, and the front wheel required braking force Fqf is still equal to or less than the maximum front wheel regenerative braking force Fxf. Therefore, the front wheel target regenerative braking force Fhf is calculated as being equal to the front wheel required braking force Fqf, and the rear wheel target friction braking force Fnr is calculated as "0" (that is, "Fhf=Fqf, Fnf=0"). Between the time point t1 to the time point t2, the front wheel required braking force Fqf is achieved only by the front wheel regenerative braking force Fgf, and the rear wheel required braking force Fqr is achieved by the rear wheel regenerative braking force Fgr and the rear wheel friction braking force Fmr.

At time point t2, the front wheel regenerative braking device KCf reaches the limit (that is, the maximum front wheel regenerative braking force Fxf). Therefore, after the time point t2, the front wheel target regenerative braking force Fhf is also determined as being equal to the maximum front wheel regenerative braking force Fxf, and the front wheel target friction braking force Fnf is increased from "0" so that the deficiency with respect to the front wheel required braking force Fqf (that is, "Fqf−Fxf") is complemented (that is, "Fhf=Fxf, Fnf=Fqf−Fxf"). As a result, after the time point t3, the front and rear wheel required braking forces Fqf and Fqr are both achieved by the front and rear wheel regenerative braking forces Fgf and Fgr and the front and rear wheel frictional braking forces Fmf and Fmr. For example, at the time point t3 (that is, the operation point (C:t3)), the front wheel required braking force Fqf is achieved as the front wheel braking force Fbf by the front wheel regenerative braking force Fgf:t3 and the front wheel friction braking force Fmf:t3, and the rear wheel required braking force Fqr is achieved as the rear wheel braking force Fbr by the rear wheel regenerative braking force Fgr:t3 and the rear wheel friction braking force Fmr:t3 (that is, "Fbf:t3=Fgf:t3+Fmf:t3, Fbr:t3=Fgr:t3+Fmr:t3").

When both the front and rear wheel regenerative braking devices KCf and KCr operate normally, at the start of braking, as the target vehicle body braking force Fv increases, the operation point of the regenerative coordination control transitions along the reference property Cb (straight line of the inclination hb, passing through the original point O) in the order of "(O:t0)→(A:t1)→(B:t2)→(C:t3)". That is, the distribution Kq and Kb of the front and rear wheel required braking forces Fqf and Fqr (that is, the ratio of the rear wheel braking force Fbr to the front wheel braking force Fbf) (resultantly, the actual front and rear wheel braking forces Fbf and Fbr) are always maintained at the constant value hb and optimized. Therefore, the directional stability of the vehicle is not impaired as a result of the balance between the front and rear wheel braking forces Fbf and Fbr. In addition, since the generation of the regenerative braking force Fg is prioritized over the generation of the friction braking force Fm, the front and rear wheel regenerative braking devices KCf and KCr can sufficiently recover the kinetic energy. As a result, at the start of braking, both the directional stability of the vehicle and the energy regeneration can be achieved at a higher level.

<<Case where Operation of Front Wheel Regenerative Braking Device KCf is in Disorder>>

Next, the case when the rear wheel regenerative braking device KCr operates appropriately but the front wheel regenerative braking device KCf is in disorder will be described with reference to the characteristic diagram of FIG. 4(*b*). Hereinafter, a case where the maximum front wheel regenerative braking force Fxf, which has a value fv3 at the time of the appropriate operation of the front wheel regenerative braking device KCf, decreases to a value fv1 due to disorder of the front wheel regenerative braking device KCf will be assumed for description (see the outlined white arrow in the diagram).

At the time point v0, the operation of the regenerative coordination control is started from the original point (O:v0). By multiplying the maximum front wheel regenerative braking force Fxf by the distribution ratio hb, the rear wheel restricted regenerative braking force Fsr is calculated (that is, "Fsr=hb·Fxf"). Since the rear wheel restricted regenerative braking force Fsr is less than the maximum rear wheel regenerative braking force Fxr, the rear wheel restricted regenerative braking force Fsr is determined as the rear wheel reference regenerative braking force Fkr (that is, "Fkr=Fsr").

At time point v1, as the front wheel required braking force Fqf reaches the maximum front wheel regenerative braking force Fxf, the rear wheel required braking force Fqr also reaches the rear wheel reference regenerative braking force Fkr (=Fsr) (see operation point (D: v1)). Therefore, between the time point v0 and the time point v1 (that is, while the operation point transitions from the point (O: v0) to the point (D: v1), since the front wheel required braking force Fqf is equal to or less than the maximum front wheel regenerative braking force Fxf and the rear wheel required braking force Fqr is equal to or less than the rear wheel reference regenerative braking force Fkr, the front and rear wheel target regenerative braking forces Fhf and Fhr are calculated as being equal to the front and rear wheel required braking forces Fqf and Fqr, and both the front and rear wheel target friction braking forces Fnf and Fnr are calculated as "0" (that is, "Fhf=Fqf, Fhf=Fqr, Fnf=Fnr=0"). As a result, the front and rear wheel frictional braking forces Fmf and Fmr are not generated, and the front and rear wheel required braking forces Fqf and Fqr are achieved (realized) only by the front and rear wheel regenerative braking forces Fgf and Fgr.

After the time point v1, the front wheel target regenerative braking force Fhf is determined as being equal to the maximum front wheel regenerative braking force Fxf, and the front wheel target friction braking force Fnf is increased from "0" so that the deficiency with respect to the front wheel required braking force Fqf (that is, "Fqf−Fxf") is complemented (that is, "Fhf=Fxf, Fnf=Fqf−Fxf"). In addition, the rear wheel target regenerative braking force Fhr is determined as being equal to the rear wheel reference regenerative braking force Fkr, and the front wheel target friction braking force Fnf is increased from "0" so that the deficiency of the front wheel required braking force Fqf (that is, "Fqf−Fkr") is complemented (that is, "Fhr=Fkr=hb·Fxf, Fnr=Fqr−Fkr") For example, at the time point v2, the front wheel required braking force Fqf is larger than the maximum front wheel regenerative braking force Fxf, and the rear wheel required braking force Fqr is larger than the rear wheel reference regenerative braking force Fkr. Therefore, the front wheel required braking force Fqf: v2 is achieved as the front wheel braking force Fbf: v2 by the front wheel regenerative braking force Fgf: v2 and the front wheel friction braking force Fmf: v2, and the rear wheel required braking force Fqr: v2 is achieved as the rear wheel braking force Fbr: v2 by the rear wheel regenerative braking force Fgr: v2 and the rear wheel friction braking force Fmr: v2 (that is, "Fbf: v2=Fgf: v2+Fmf: v2, Fbr: v2=Fgr: v2+Fmr: v2") (see operation point (E: v2)).

Note that, when the front wheel regenerative braking force Fgf cannot be generated at all due to the failure of the front wheel regenerative braking device KCf, the maximum front wheel regenerative braking force Fxf is set to "0". In this case, since the rear wheel restricted regenerative braking force Fsr is "0", the rear wheel reference regenerative braking force Fkr is determined to be "0". Therefore, when the front wheel regenerative braking device KCf fails, the generation of the rear wheel regenerative braking force Fgr by the rear wheel regenerative braking device KCr is prohibited. That is, since the rear wheel target regenerative braking force Fhr is also calculated as "0" when the rear wheel regenerative braking force Fgr can be generated, the rear wheel regenerative braking force Fgr is not generated (that is, "Fhr=Fgr=0").

In the braking control device SC (in particular, the fluid unit HU) according to the first embodiment, there is a restriction that "the front wheel brake fluid pressure Pwf is equal to or less than the rear wheel brake fluid pressure Pwr". Therefore, in a state in which the front wheel regenerative braking device KCf falls into disorder and the front wheel regenerative braking force Fgf cannot be sufficiently generated, the generation of the rear wheel regenerative braking force Fgr is limited by the rear wheel restricted regenerative braking force Fsr (that is, the rear wheel reference regenerative braking force Fkr) when the rear wheel regenerative braking device KCr is capable of the regeneration amount. In such a manner, since the ratio (distribution ratio) Kb (=Fbr/Fbf) of the rear wheel braking force Fbr to the front wheel braking force Fbf is always maintained at the constant value hb, the directional stability of the vehicle JV is secured.

<Front and Rear Wheel Braking Force Distribution at the Time of Switching Operation in Regenerative Coordination Control According to First Embodiment>

Figure 5B:
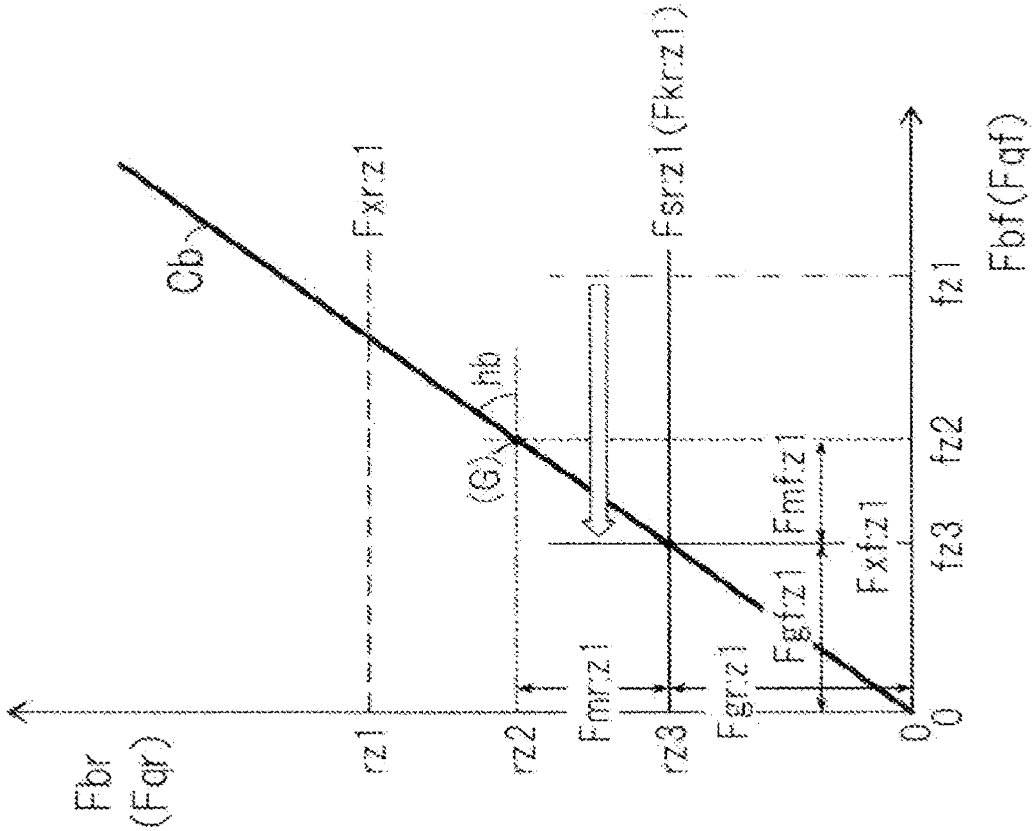
FIG. 5 is a characteristic diagram for describing the front and rear wheel braking force distribution at the time of switching operation in the first embodiment.
Figure 5A:
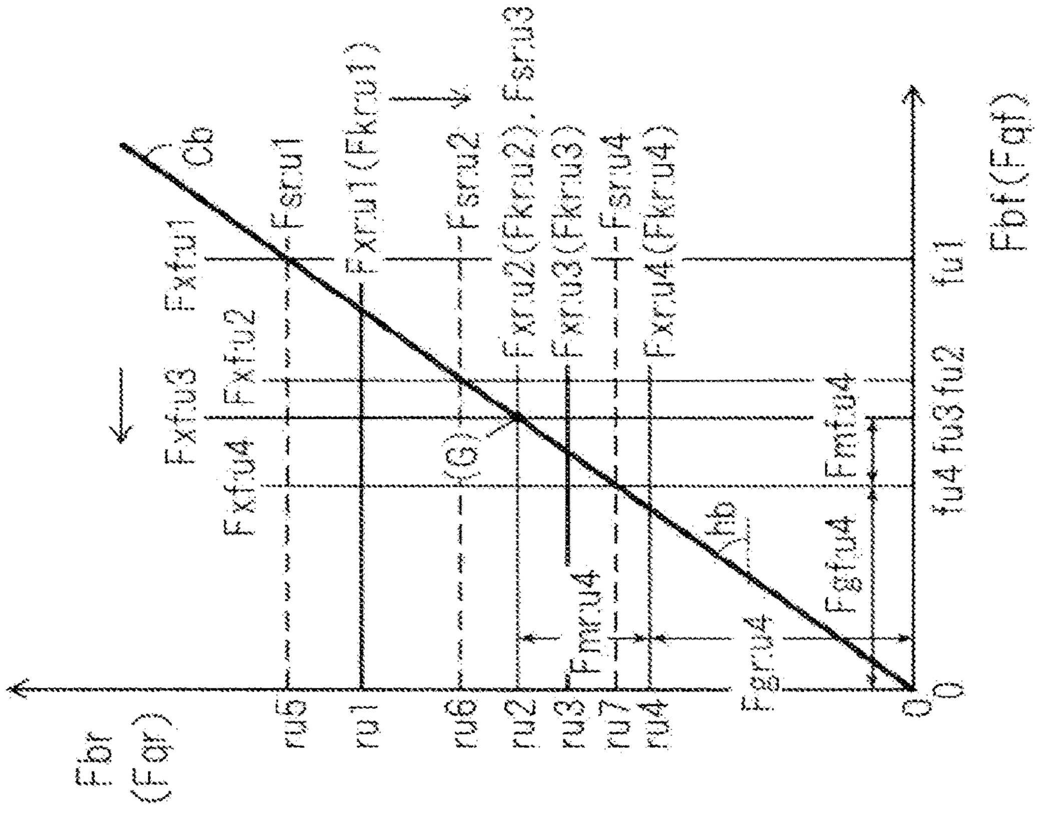

The front and rear wheel braking force distribution in the regenerative coordination control at the time of switching operation in the first embodiment will be described with reference to the characteristic diagram of FIGS. 5(*a*) and (*b*). "Switching operation" is to complement the decrease of the regenerative braking force Fg by the friction braking force Fm when and the regenerative braking force Fg decreases along with the decrease of the vehicle body speed Vx. That is, by performing the switching operation, the generation of the front and rear wheel braking forces Fbf and Fbr are gradually switched from the regenerative braking force Fg to the friction braking force Fm.

<<Case where Both the Front and Rear Wheel Regenerative Braking Devices KCf and KCr Operate Appropriately>>

The case when both the front and rear wheel regenerative braking devices KCf and KCr operate appropriately will be described with reference to the characteristic diagram of FIG. 5(*a*). In the characteristic diagram, a situation is assumed in which the vehicle is sequentially decelerated from the time point u1 and the switching operation (the transition from the regenerative braking to the friction braking) is performed in a state where the vehicle body deceleration Gx (that is, the target vehicle body braking force Fv) is maintained constant. In the characteristic diagram, since the target vehicle body braking force Fv is constant, the operation point of the regenerative coordination control remains at the point (G) when the vehicle is sequentially decelerated after the time T elapses. As described above, the notation ":" in the drawing indicates a value at a corresponding time point.

As the vehicle body speed Vx (that is, rotation speeds Ngf and Ngr of the front and rear wheel generators) decreases, the maximum front wheel regenerative braking force Fxf decreases in the order of the value fu1 (=Fxf: u1)→fu2 (=Fxf: u2)→fu3 (=Fxf: u3)→fu4 (=Fxf: u4), and the maximum rear wheel regenerative braking force Fxr decreases in the order of the value ru1 (=Fxr: u1)→ru2 (=Fxr: u2)→ru3 (=Fxr: u3)→ru4 (=Fxr: u4). In addition, according to the decrease of the maximum front wheel regenerative braking force Fxf, the rear wheel restricted regenerative braking force Fsr (=hb Fxf) decreases in the order of the value ru5 (=Fsr: u1)→ru6 (=Fsr: u2)→ru2 (=Fsr: u3)→ru7 (=Fsr: u4). When both the front and rear wheel regenerative braking devices KCf and KCr operate appropriately, "Fsr>Fxr" is always satisfied, and therefore, the maximum rear wheel regenerative braking force Fxr is calculated as the rear wheel reference regenerative braking force Fkr (that is, "Fkr=Fxr").

For example, at the time point u1, the front wheel required braking force Fqf: u1 is less than the maximum front wheel regenerative braking force Fxf: u1, and the rear wheel required braking force Fqr: u1 is less than the rear wheel reference regenerative braking force Fkr: u1 (=Fxr: u1). Thereafter, at the time point t2, the rear wheel required braking force Fqr: u2 matches the rear wheel reference regenerative braking force Fkr: u2 (=Fxr: u2). Therefore, "Fhf=Fqf, Fhr=Fqr, Fnf=Fnr=0" is calculated between the time point u1 and the time point u2. As a result, the front and rear wheel required braking forces Fqf and Fqr are achieved (realized) only by the front and rear wheel regenerative braking forces Fgf and Fgr.

At the time point t3, the front wheel required braking force Fqf: u3 matches the maximum front wheel regenerative braking force Fxf: u3. Therefore, "Fhf=Fqf, Fhr=Fkr (=Fxr), Fnf=0, Fnr=Fqr−Fkr" is calculated between the time point u2 and the time point u3. As a result, the front wheel required braking force Fqf is achieved only by the front wheel regenerative braking force Fgf, and the rear wheel required braking force Fqr is achieved by the rear wheel regenerative braking force Fgr and the rear wheel friction braking force Fmr.

After the time point t3, the front wheel required braking force Fqf becomes larger than the maximum front wheel regenerative braking force Fxf, and the rear wheel required braking force Fqr becomes larger than the rear wheel reference regenerative braking force Fkr (=Fxr). Therefore, "Fhf=Fxf, Fhr=Fkr, Fnf=Fqf−Fkf, Fnr=Fqr−Fxf" is calculated after the time point u3. As a result, the front and rear wheel required braking forces Fqf and Fqr are achieved by the front and rear wheel regenerative braking forces Fgf and Fgr and the front and rear wheel frictional braking force Fmf and Fmr.

As described above, when the front and rear wheel regenerative braking devices KCf and KCr operate appropriately, the regenerative braking force Fg is prioritized over the friction braking force Fm after the distribution adjustment of the front and rear wheel braking forces Fbf and Fbr is optimized. As in the case at the start of braking, the directional stability of the vehicle is improved and a sufficient energy regeneration amount is secured at the time of the switching operation.

<<Case where Operation of Front Wheel Regenerative Braking Device KCf is in Disorder>>

The case when the rear wheel regenerative braking device KCr operates appropriately but the front wheel regenerative braking device KCf is in disorder will be described with reference to the characteristic diagram of FIG. 5(*b*). Hereinafter, a case where the maximum front wheel regenerative braking force Fxf decreases from the value fz1 (at the time of appropriate operation) to the value fz3 as indicated by an outlined white arrow in the drawing will be assumed for description. Here, the operation point of the regenerative coordination control is the point (G).

At the time point z1, since the maximum front wheel regenerative braking force Fxf: z1 has the value fz3, the rear wheel restricted regenerative braking force Fsr: z1 is calculated as the value rz3 (=hb·fz3). At the time point z1, the rear wheel restricted regenerative braking force Fsr: z1 is less than the maximum rear wheel regenerative braking force Fxr: z1. Therefore, the rear wheel restricted regenerative braking force Fsr: z1 is calculated as the rear wheel reference regenerative braking force Fkr: z1 (That is, "Fkr: z1=Fsr: z1"). At the time point z1, since the front wheel required braking force Fqf: z1 is larger than the maximum front wheel regenerative braking force Fxf: z1 and the rear wheel required braking force Fqr: z1 is larger than the rear wheel reference regenerative braking force Fkr: z1, "Fhf=Fxf, Fhr=Fkr, Fnf=Fqf−Fxf, Fnr=Fqr−Fkr" is calculated. As a result, the front and rear wheel required braking forces Fqf and Fqr are achieved by the front and rear wheel regenerative braking forces Fgf and Fgr and the front and rear wheel frictional braking force Fmf and Fmr (that is, "Fqf:z1=Fgf:z1+Fmf:z1, Fqr:z1=Fgr:z1+Fmr:z1"). In the switching operation of the regenerative coordination control, when the front wheel regenerative braking device KCf falls into disorder, the generation of the rear wheel regenerative braking force Fgr is limited by the rear wheel reference regenerative braking force Fkr (that is, the rear wheel restricted regenerative braking force Fsr). In such a manner, the distribution ratios Kq and Kb of the front and rear wheel braking forces are maintained constant, and thus the vehicle stability is satisfactorily secured.

Second Embodiment of Braking Control Device SC

Next, a second embodiment of the braking control device SC will be described. In the first embodiment, the regenerative capacity of the front wheel regenerative braking device KCf is relatively larger than the regenerative capacity of the rear wheel regenerative braking device KCr in the front and rear wheel regenerative braking devices KCf and KCr, and therefore, the rear wheel regenerative braking device KCr reaches the generation limit of the regenerative braking force earlier than the front wheel regenerative braking device KCf. Oppositely in the second embodiment, the regenerative capacity of the rear wheel regenerative braking device KCr is relatively larger than that of the front wheel regenerative braking device KCf, and the generation limit of the regenerative braking force of the rear wheel regenerative braking device KCr is larger than the generation limit of the regenerative braking force of the front wheel regenerative braking device KCf. Therefore, the front wheel regenerative braking device KCf reaches the generation limit of the regenerative braking force earlier than the rear wheel regenerative braking device KCr. In the schematic diagram of FIG. 2 and the flowchart of FIG. 3, the symbols indicated in [ ] correspond to the description of the second embodiment. Hereinafter, differences between the first embodiment and the second embodiment will be described. Note that, the first embodiment and the second embodiment are the same except for the differences.

Figure 2:
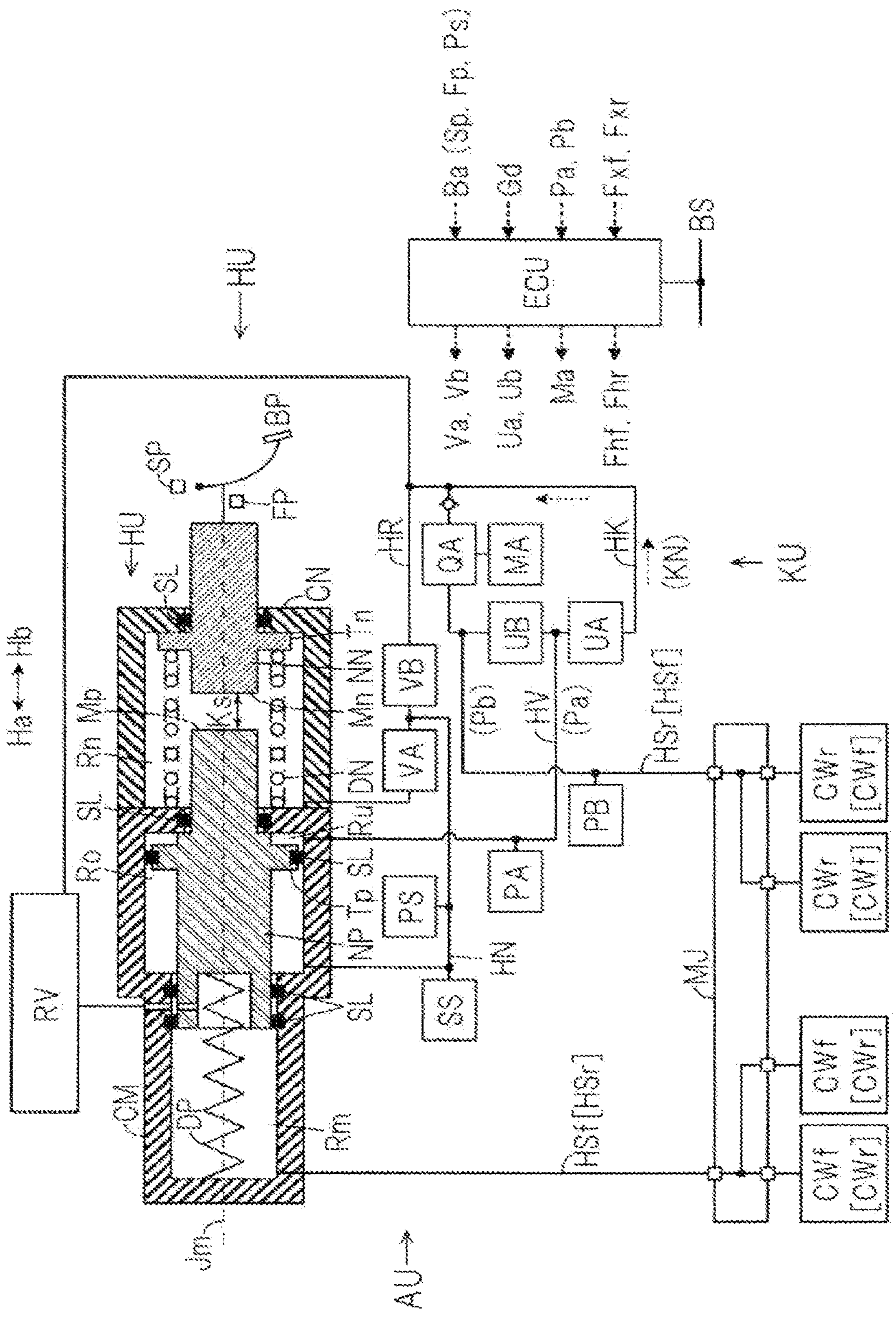
FIG. 2 is a schematic view for describing a first embodiment of the braking control device SC.

In the schematic diagram of FIG. 2, in the second embodiment, the master cylinder CM and the rear wheel cylinder CWr are connected via the rear wheel connection passage HSr. Therefore, the master fluid pressure Pm (=Pa) is supplied to the rear wheel cylinder CWr. In addition, the reflux passage HK is connected to the front wheel cylinder CWf via the front wheel connection passage HSf between the fluid pump QA (in particular, the discharge portion) and the second pressure adjusting valve UB. Therefore, the second adjusted fluid pressure Pb is supplied to the front wheel cylinder CWf. Therefore, in the fluid unit HU (actuator) in the second embodiment, there is a restriction that "the front wheel braking fluid pressure Pwf is always equal to or larger than the rear wheel brake fluid pressure Pwr" with respect to the magnitude relationship between the front wheel brake fluid pressure Pwf and the rear wheel brake fluid pressure Pwr.

In step S150 in the flow chart of FIG. 3 in the second embodiment, the front wheel reference regenerative braking force Fkf is calculated based on the maximum rear wheel regenerative braking force Fxr. The "front wheel reference regenerative braking force Fkf-" is a state variable for restricting the front wheel target regenerative braking force Fhf (resultantly, the front wheel regenerative braking force Fgf) so that the distribution ratios Kq and Kb of the front and rear wheel braking forces are maintained at a constant value hb when the maximum rear wheel regenerative braking force Fxr decreases due to disorder (for example, the temperature rise of the rear wheel regenerative controller EGr) of the rear wheel regenerative braking device KCr. Specifically, the maximum rear wheel regenerative braking force Fxr is divided by the constant value hb (distribution ratio) to calculate the front wheel restricted regenerative braking force Fsf (that is, "Fsf=Fxr/hb"). The smaller one of the maximum front wheel regenerative braking force Fxf and the front wheel restricted regenerative braking force Fsf is determined as the front wheel reference regenerative braking force Fkf (that is, "Fkf=MIN (Fxf, Fsf)"). Then, the generation of the front wheel regenerative braking force Fgf is restricted based on the front wheel reference regenerative braking force Fkf. For example, when the rear wheel regenerative braking device KCr completely fails, the maximum rear wheel regenerative braking force Fxr is "0", and therefore, the front wheel reference regenerative braking force Fkf is calculated as "0" (That is, "Fxr=0, Fkf=0"). Therefore, when the rear wheel regenerative braking device KCr fails, the generation of the front wheel regenerative braking force Fgf is prohibited.

In the second embodiment, the fluid unit HU has a restriction of "Pwf≥Pwr" (a restriction opposite to that in the first embodiment), but this restriction does not affect the regenerative coordination control when the front wheel regenerative braking device KCf is in disorder. Therefore, when the generation of the rear wheel regenerative braking force Fgr is not limited when the front wheel regenerative braking device KCf is in disorder, the distribution ratios Kq and Kb of the front and rear wheel braking forces can be maintained constant. That is, although the maximum front wheel regenerative braking force Fxf may decrease due to disorder of the front wheel regenerative braking device KCf, the regeneration amount of the rear wheel regenerative braking device KCr (that is, the rear wheel regenerative braking force Fgr) is not intentionally limited. In summary, when the front wheel regenerative braking device KCf completely fails and the front wheel regenerative braking force Fgf cannot be generated at all, the generation of the rear wheel regenerative braking force Fgr is permitted, but when the rear wheel regenerative braking device KCr completely fails and the rear wheel regenerative braking force Fgr cannot be generated at all, the generation of the front wheel regenerative braking force Fgf is prohibited.

<Front and Rear Wheel Braking Force Distribution at the Start of Braking in Regenerative Coordination Control According to Second Embodiment>

Figure 6A:
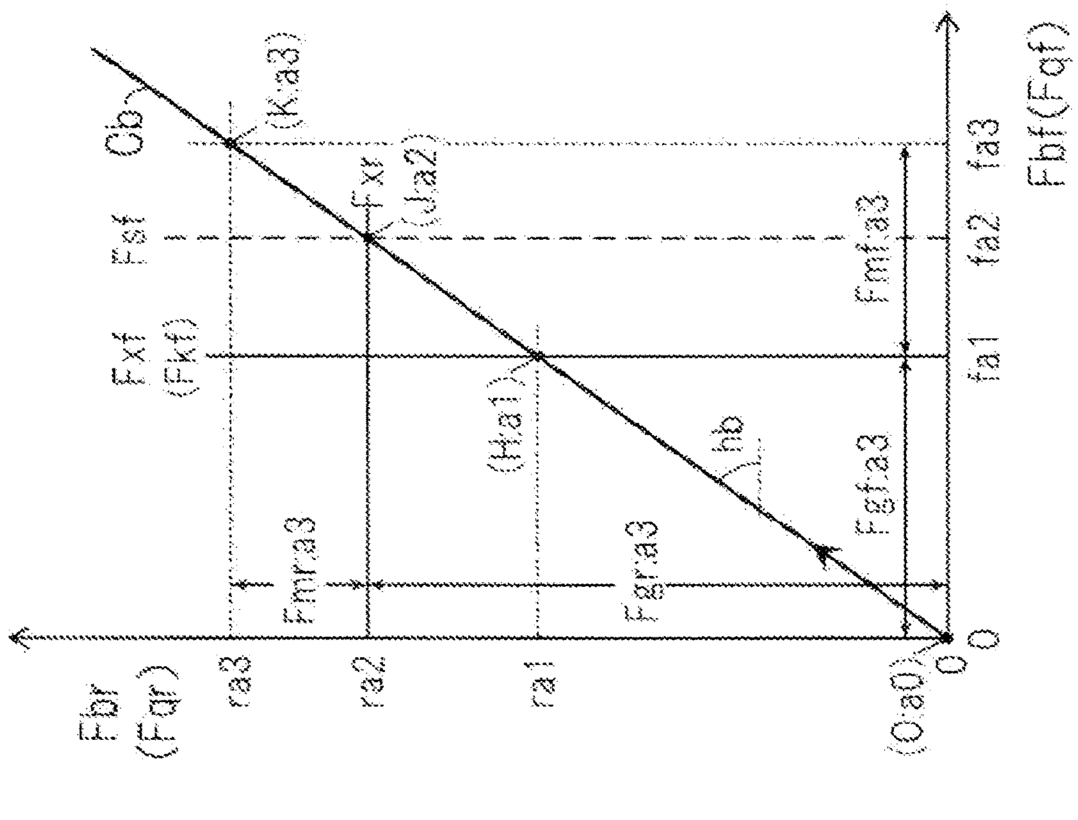
FIG. 6 is a characteristic diagram for describing the front and rear wheel braking force distribution at the start of braking in a second embodiment.
Figure 6B:
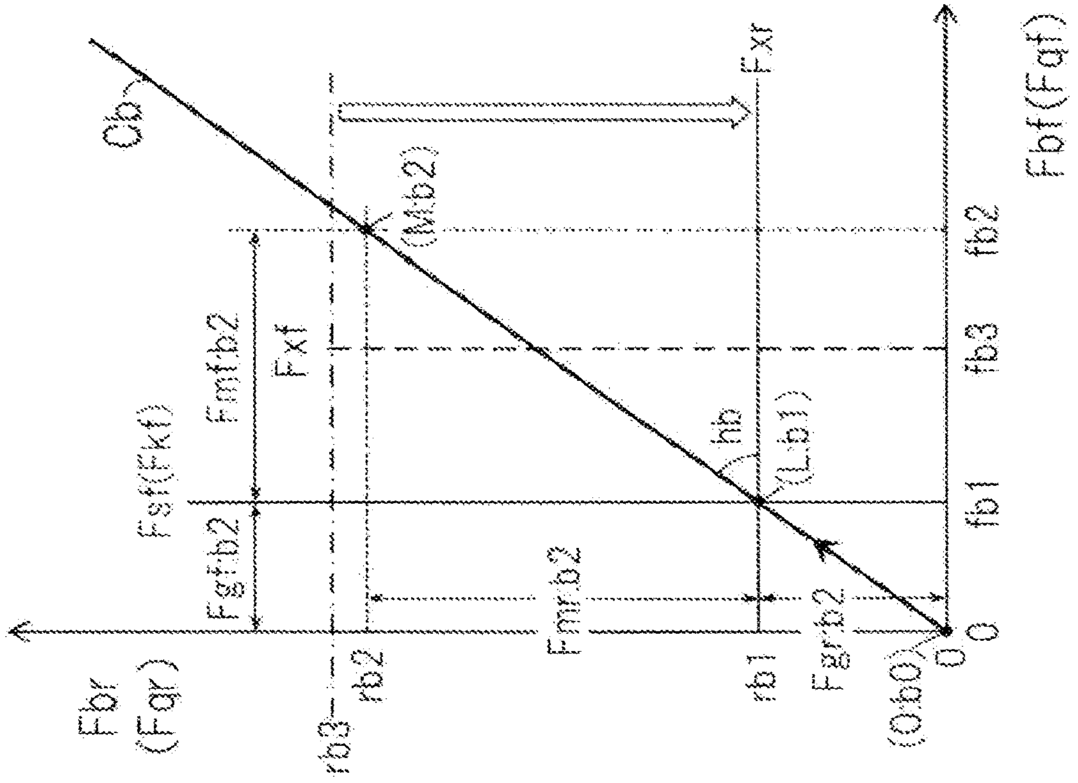

The front and rear wheel braking force distribution in the regenerative coordination control at the start of braking in the second embodiment will be described with reference to the characteristic diagram of FIGS. 6(*a*) and (*b*). FIG. 6(*a*) refers to a case where the front and rear wheel regenerative braking devices KCf and KCr both operate appropriately, and FIG. 6(*b*) refers to a case where the front wheel regenerative braking device KCf operates appropriately but the rear wheel regenerative braking device KCr is in disorder, respectively.

<<Case where Both the Front and Rear Wheel Regenerative Braking Devices KCf and KCr Operate Appropriately>>

The case when both the front and rear wheel regenerative braking devices KCf and KCr operate appropriately will be described with reference to the characteristic diagram of FIG. 6(*a*). As the braking starts, at the time point a0, the operation of the regenerative coordination control starts from the original point (O:b0). At the time point a1, the front wheel regenerative braking device KCf reaches the limit (that is, the maximum front wheel regenerative braking force Fxf) (see the operation point (H:a1)). Thereafter, at the time point a2, the rear wheel regenerative braking device KCr reaches the limit (that is, the maximum rear wheel regenerative braking force Fxr) (see the operation point (J:a2)). In such a manner, in the second embodiment, the front wheel regenerative braking device KCf reaches the limit earlier than the rear wheel regenerative braking device KCr.

The front wheel restricted regenerative braking force Fsf is calculated based on the maximum rear wheel regenerative braking force Fxr and the distribution ratio hb for each calculation cycle. Specifically, the maximum rear wheel regenerative braking force Fxr is divided by the constant value hb (distribution ratio) to calculate the front wheel restricted regenerative braking force Fsf (that is, "Fsf=Fxr/hb"). The maximum front wheel regenerative braking force Fxf and the front wheel restricted regenerative braking force Fsf are compared, and a smaller one of them is determined as the front wheel reference regenerative braking force Fkf. When the rear wheel regenerative braking device KCr operate appropriately, "Fxf<Fsf" is satisfied, and therefore, the maximum front wheel regenerative braking force Fxf is determined as the front wheel reference regenerative braking force Fkf (that is, "Fkf=Fxf").

Since "Fqf≤Fkf (=Fxf), Fqr≤Fxr" is satisfied between the time point a0 and the time point a1 (that is, while the operation point transitions from the point (O: a0) to the point (H: a1)), the front wheel target regenerative braking force Fhf is calculated as being equal to the front wheel required braking force Fqf, and the rear wheel target regenerative braking force Fhr is calculated as being equal to the rear wheel required braking force Fqr (that is, "Fhf=Fqf, Fhr=Fqr"). At this time, since the friction braking is unnecessary, the front and rear wheel target friction braking forces Fnf and Fnr are calculated as "0" (that is, "Fnf=Fnr=0"). As a result, the front and rear wheel frictional braking forces Fmf and Fmr are not generated, and the front and rear wheel required braking forces Fqf and Fqr are achieved only by the front and rear wheel regenerative braking forces Fgf and Fgr.

Since "Fqf>Fkf (=Fxf)" is satisfied between the time point a1 and the time point a2 (that is, while the operation point transitions from the point (H: a1) to the point (J: a2)), the front wheel target regenerative braking force Fhf is calculated as being equal to the front wheel reference regenerative braking force Fkf, and the front wheel target friction braking force Fnf is increased so that the deficiency of the front wheel required braking force Fqf is complemented (that is, "Fhf=Fkf, Fnf=Fqf−Fkf"). Note that, since "Fqr≤Fxr" is satisfied, "Fhr=Fqr, Fnr=0" is determined. Therefore, the front wheel required braking force Fqf is achieved by the front wheel regenerative braking force Fgf and the front wheel friction braking force Fmf, and the rear wheel required braking force Fqr is achieved only by the rear wheel regenerative braking force Fgr.

That is, after the time point a2, as in the case of the front wheel target regenerative braking force Fhf, the rear wheel target regenerative braking force Fhr is determined as being equal to the maximum rear wheel regenerative braking force Fxr, and the rear wheel target friction braking force Fnr is increased from "0" so that the deficiency with respect to the rear wheel required braking force Fqr is complemented (that is, "Fhf=Fkf, Fnf=Fqf−Fkf, Fhr=Fxr, Fnr=Fqr−Fxr"). As a result, after the time point a3, the front and rear wheel required braking forces Fqf and Fqr are both achieved by the front and rear wheel regenerative braking forces Fgf and Fgr and the front and rear wheel frictional braking forces Fmf and Fmr. For example, at the time point a3 (that is, the operation point (K: a3)), the front wheel required braking force Fqf is achieved as the front wheel braking force Fbf by the front wheel regenerative braking force Fgf: a3 and the front wheel friction braking force Fmf: a3, and the rear wheel required braking force Fqr is achieved as the rear wheel braking force Fbr by the rear wheel regenerative braking force Fgr: a3 and the rear wheel friction braking force Fmr: a3 (That is, "Fbf: a3=Fgf: a3+Fmf: a3, Fbr: a3=Fgr: a3+Fmr: a3").

When both the front and rear wheel regenerative braking devices KCf and KCr operate normally, the ratio Kb of the rear wheel braking force Fbr to the front wheel braking force Fbf (distribution ratio of the front and rear wheel braking forces) is also always maintained at a constant value hb in the second embodiment. Since the distribution ratios Kq and Kb are optimized in this manner, the directional stability of the vehicle JV is improved. In addition, since regenerative braking is prioritized over friction braking in the regenerative coordination control, sufficient energy regeneration is achieved. That is, both the directional stability of the vehicle and the energy regeneration can be achieved at a higher level.

<<Case where Operation of Rear Wheel Regenerative Braking Device KCr is in Disorder>>

The case when the front wheel regenerative braking device KCf operates appropriately but the rear wheel regenerative braking device KCr is in disorder will be described with reference to the characteristic diagram of FIG. 6(*b*). Hereinafter, a case where the maximum rear wheel regenerative braking force Fxr, which has a value rb3 at the time of the appropriate operation of the rear wheel regenerative braking device KCr, decreases to a value rb1 due to disorder of the rear wheel regenerative braking device KCr will be assumed for description (see the outlined white arrow in the diagram).

At the time point b0, the operation of the regenerative coordination control is started from the original point (O:b0). From the time point b0, the front wheel restricted regenerative braking force Fsf is calculated based on the maximum rear wheel regenerative braking force Fxr and the distribution ratio hb for each calculation cycle. Since the maximum rear wheel regenerative braking force Fxr decreases due to disorder of the rear wheel regenerative braking device KCr, the front wheel restricted regenerative braking force Fsf (=Fxr/hb) is less than the maximum front wheel regenerative braking force Fxf. Therefore, the front wheel restricted regenerative braking force Fsf is determined as the front wheel reference regenerative braking force Fkf (that is, "Fkf=Fsf=Fxr/hb").

At time point b1, as the front wheel required braking force Fqf reaches the front wheel reference regenerative braking force Fkf (=Fsf), the rear wheel required braking force Fqr also reaches the maximum rear wheel regenerative braking force Fxr (see operation point (L: b1)). Therefore, between the time point b0 and the time point b1 (that is, while the operation point transitions from the point (O: b0) to the point (L: b1), the front wheel required braking force Fqf is equal to or less than the front wheel reference regenerative braking force Fkf, and the rear wheel required braking force Fqr is equal to or less than the maximum rear wheel regenerative braking force Fxr. Therefore, the front and rear wheel target regenerative braking forces Fhf and Fhr are calculated as being equal to the front and rear wheel required braking forces Fqf and Fqr, and the front and rear wheel target friction braking forces Fnf and Fnr are calculated as "0" (that is, "Fhf=Fqf, Fhf=Fqr, Fnf=Fnr=0"). As a result, the front and rear wheel frictional braking forces Fmf and Fmr are not generated, and the front and rear wheel required braking forces Fqf and Fqr are achieved only by the front and rear wheel regenerative braking forces Fgf and Fgr.

Since "Fqf>Fkf, Fqr>Fxr" is satisfied after the time point b1, "Fhf=Fkf, Fnf=Fqf−Fkf, Fhr=Fxr, Fnr=Fqr−Fxr" is calculated. That is, the front and rear wheel required braking forces Fqf and Fqr are achieved by the front and rear wheel regenerative braking forces Fgf and Fgr and the front and rear wheel frictional braking forces Fmf and Fmr. For example, at the time point b2, "Fbf: b2=Fgf: b2+Fmf: b2, Fbr: b2=Fgr: b2+Fmr: b2" is satisfied (see the operation point (M: b2)). Note that, when the rear wheel regenerative braking device KCr fails, the maximum rear wheel regenerative braking force Fxr is "0", and therefore, "Fsf=0, Fkf=0" is determined, and the generation of the front wheel regenerative braking force Fgf is prohibited. That is, since the front wheel target regenerative braking force Fhf is also calculated as "0" when the front wheel regenerative braking force Fgf can be generated by the front wheel regenerative braking device KCf, the front wheel regenerative braking force Fgf is not generated (that is, "Fhf=Fgf=0").

In the braking control device SC (in particular, the fluid unit HU) according to the second embodiment, there is always a restriction that "the rear wheel brake fluid pressure Pwr is equal to or less than the front wheel brake fluid pressure Pwf". Therefore, in a state in which the rear wheel regenerative braking device KCr falls into disorder and the rear wheel regenerative braking force Fgr cannot be sufficiently generated, the front wheel regenerative braking force Fgf is limited by the front wheel restricted regenerative braking force Fsf (=Fxr/hb) when the front wheel regenerative braking device KCf is capable of the regeneration amount. In such a manner, the distribution ratio of the front and rear wheel braking forces is always maintained constant value hb, and thus the vehicle stability is secured.

<Front and Rear Wheel Braking Force Distribution at the Time of Switching Operation in Regenerative Coordination Control According to Second Embodiment>

Figure 7B:
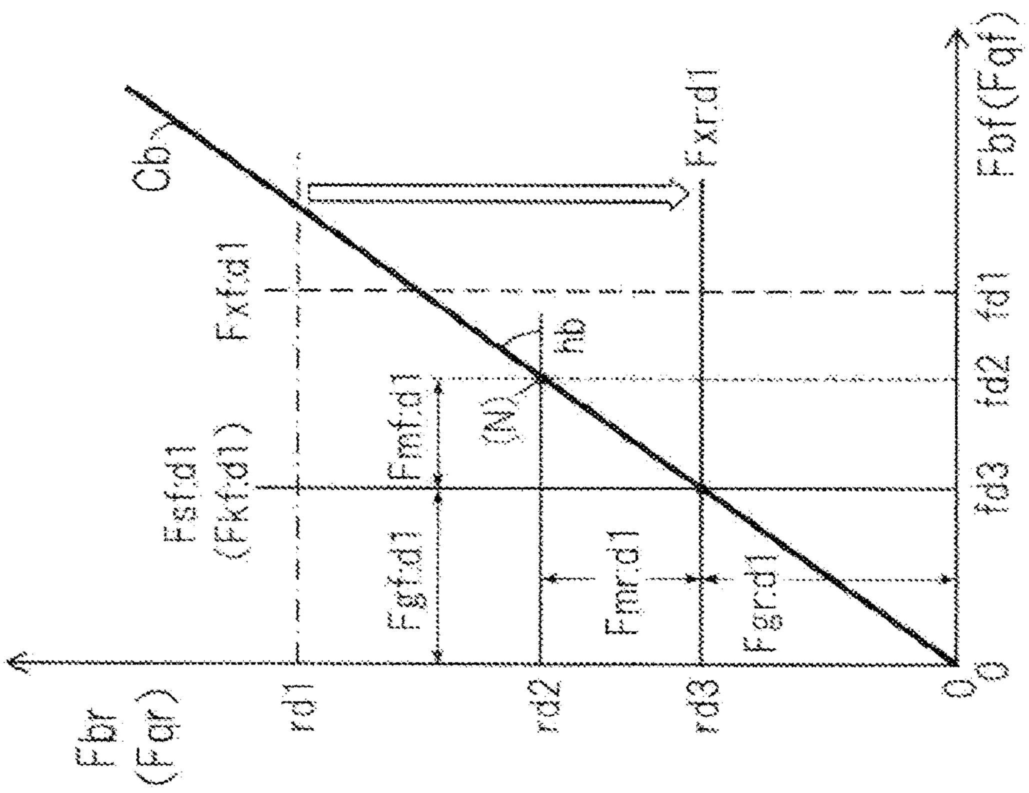
FIG. 7 is a characteristic diagram for describing the front and rear wheel braking force distribution at the time of switching operation in the second embodiment.
Figure 7A:
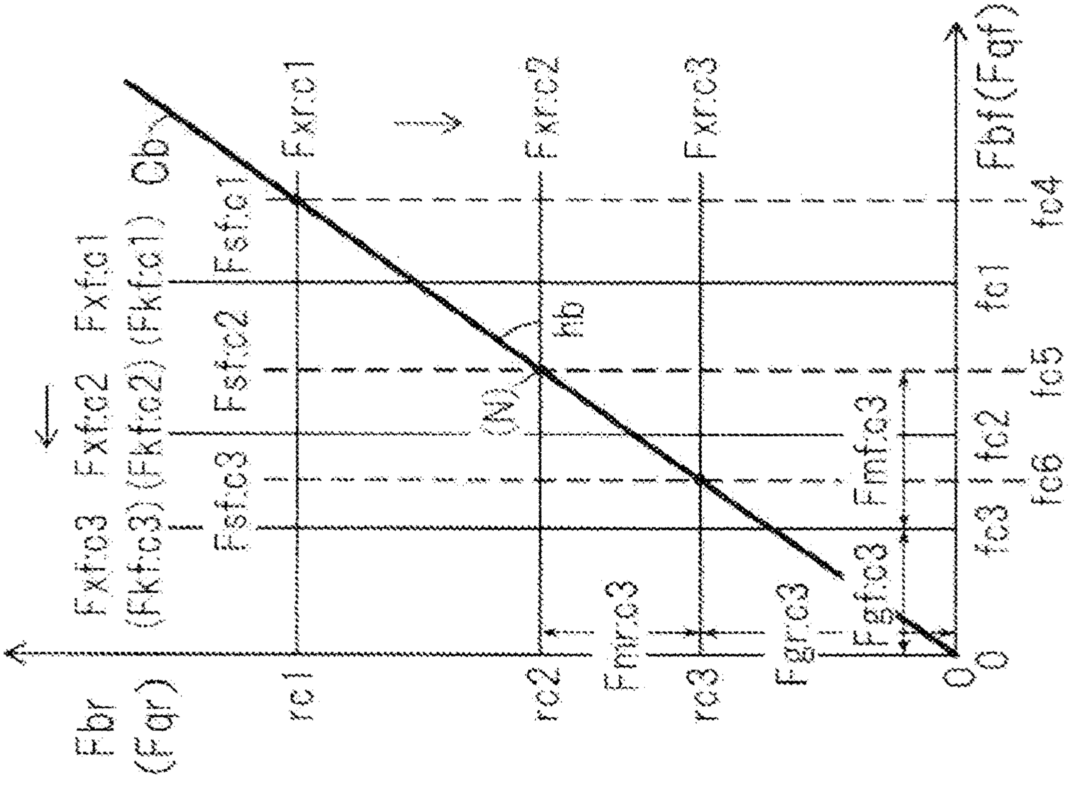

The front and rear wheel braking force distribution in the regenerative coordination control at the time of switching operation in the second embodiment will be described with reference to the characteristic diagram of FIGS. 7(*a*) and (*b*). FIG. 7(*a*) refers to a case where the front and rear wheel regenerative braking devices KCf and KCr both operate appropriately, and FIG. 7(*b*) refers to a case where the front wheel regenerative braking device KCf operates appropriately but the rear wheel regenerative braking device KCr is in disorder, respectively.

<<Case where Both the Front and Rear Wheel Regenerative Braking Devices KCf and KCr Operate Appropriately>>

The case when both the front and rear wheel regenerative braking devices KCf and KCr operate appropriately will be described with reference to the characteristic diagram of FIG. 7(*a*). In the example, it is assumed that the target vehicle body braking force Fv is constant and the regenerative coordination control remains at the operation point (N). As the vehicle body speed Vx (that is, rotation speeds Ngf and Ngr of the front and rear wheel generators) decreases, the maximum front wheel regenerative braking force Fxf decreases in the order of the value fc1 (=Fxf:c1)→fc2 (=Fxf:c2)→fc3 (=Fxf:c3), and the maximum rear wheel regenerative braking force Fxr decreases in the order of the value rc1 (=Fxr:c1)→rc2 (=Fxr:c2)→rc3 (=Fxr:c3). The front wheel restricted regenerative braking force Fsf is calculated by dividing the maximum rear wheel regenerative braking force Fxr by the distribution ratio hb for each calculation cycle. Therefore, the front wheel restricted regenerative braking force Fsf (=Fxr/hb) decreases in the order of the value fc4 (=Fsf:c1)→fc5 (=Fsf:c2)→fc6 (=Fsf: c3) according to the decrease in the maximum rear wheel regenerative braking force Fxr. Here, when the front and rear wheel regenerative braking devices KCf and KCr operate appropriately, "Fsf>Fxf" is always satisfied, and therefore, the maximum front wheel regenerative braking force Fxf is calculated as the front wheel reference regenerative braking force Fkf.

At the time point c1, the state is "Fqf≤Fkf, Fqr≤Fxr". After the time point c1, the front wheel required braking force Fqf matches the front wheel reference regenerative braking force Fkf (=Fxf). Thereafter, at the time point c2, the maximum rear wheel regenerative braking force Fxr:c2 matches the rear wheel required braking force Fqr. After the time point c2, the state is "Fqf>Fkf, Fqr>Fxr".

"Fhf=Fqf, Fhr=Fqr, Fnf=Fnr=0" is calculated while "Fqf≤Fkf, Fqr≤Fxr" is satisfied. As a result, the front and rear wheel required braking forces Fqf and Fqr are achieved (realized) only by the front and rear wheel regenerative braking forces Fgf and Fgr. Thereafter, "Fhf=Fkf (=Fxf), Fhr=Fqr, Fnf=Fqf−Fkf, Fnr=0" is calculated while "Fqf>Fkf, Fqr≥Fxr" is satisfied. As a result, the front wheel required braking force Fqf is achieved by the front wheel regenerative braking force Fgf and the front wheel friction braking force Fmf, and the rear wheel required braking force Fqr is achieved only by the rear wheel regenerative braking force Fgr. Since "Fqf>Fkf, Fqr>Fxr" is satisfied after the time point c2, "Fhf=Fkf (=Fxf), Fhr=Fxr, Fnf=Fqf−Fkf, Fnr=Fqr−Fxr" is calculated. As a result, the front and rear wheel required braking forces Fqf and Fqr are achieved by the front and rear wheel regenerative braking forces Fgf and Fgr and the front and rear wheel frictional braking force Fmf and Fmr.

When the front and rear wheel regenerative braking devices KCf and KCr operate appropriately, the regenerative braking force Fg is prioritized over the friction braking force Fm after the distribution adjustment of the front and rear wheel braking forces is optimized to the constant value hb. As in the first embodiment, as the directional stability of the vehicle is improved, a sufficient energy regeneration amount is also secured at the time of the switching operation of the regenerative coordination control in the second embodiment.

<<Case where Operation of Rear Wheel Regenerative Braking Device KCr is in Disorder>>

The case when the front wheel regenerative braking device KCf operates appropriately but the rear wheel regenerative braking device KCr is in disorder will be described with reference to the characteristic diagram of FIG. 7(*b*). Hereinafter, a case where the maximum rear wheel regenerative braking force Fxr decreases from the value rd1 (at the time of appropriate operation) to the value rd3 as indicated by an outlined white arrow in the drawing will be assumed for description. Note that, the regenerative coordination control is operated at the point (N).

At the time point d1, since the maximum rear wheel regenerative braking force Fxr: d1 has the value rd3, the front wheel restricted regenerative braking force Fsf:d1 is calculated as the value fd3 (=rd3/hb). At the time point d1, since "Fsf:d1<Fxf:d1" is satisfied, the front wheel restricted regenerative braking force Fsf:d1 is calculated as the front wheel reference regenerative braking force Fkf:d1 (that is, "Fkf:d1=Fsf:d1"). At the time point d1, since "Fqf>Fkf, Fqr>Fxr" is satisfied, "Fhf=Fkf (=Fsf), Fhr=Fxr, Fnf=Fqf−Fkf, Fnr=Fqr−Fxr" is calculated. As a result, the front and rear wheel required braking forces Fqf and Fqr are achieved by the front and rear wheel regenerative braking forces Fgf and Fgr and the front and rear wheel frictional braking forces Fmf and Fmr (that is, "Fqf:d1=Fgf:d1+Fmf:d1, Fqr:d1=Fgr: d1+Fmr:d1"). In the switching operation at the time of disorder of the rear wheel regenerative braking device KCr, the distribution ratios Kq (target value) and Kb (actual value) of the front and rear wheel braking forces are also maintained at the constant value hb in the regenerative coordination control in the braking control device SC, so that the vehicle stability is secured.

Summary of First and Second Embodiments of Braking Control Device SC

Hereinafter, embodiments of the braking control device SC will be summarized. The braking control device SC is applied to a vehicle JV including a front wheel regenerative braking device KCf that generates a front wheel regenerative braking force Fgf on a front wheel WHf and a rear wheel regenerative braking device KCr that generates a rear wheel regenerative braking force Fgr on a rear wheel WHr. The braking control device SC includes "an actuator HU that supplies a front wheel brake fluid pressure Pwf to the front wheel cylinder CWf to generate a front wheel friction braking force Fmf to the front wheel WHf, and supplies a rear wheel brake fluid pressure Pwr to the rear wheel cylinder CWr to generate a rear wheel friction braking force Fmr to the rear wheel WHr", and a controller ECU that controls the front and rear wheel regenerative braking devices KCf and KCr and the actuator HU".

In the first embodiment of the braking control device SC, the actuator HU has a restriction that "the rear wheel brake fluid pressure Pwr is equal to or larger than the front wheel brake fluid pressure Pwf (that is, "Pwf≤Pwr").". In this configuration, the controller ECU calculates the braking force required for the vehicle JV as a whole as the target vehicle body braking force Fv, and calculates the front and rear wheel required braking forces Fqf and Fqr so that the sum of the front and rear wheel required braking forces Fqf and Fqr matches the target vehicle body braking force Fv and the ratio Kq of the rear wheel required braking force Fqr to the front wheel required braking force Fqf is constant (a constant value hb). In addition, the controller ECU acquires the maximum generation values of the front and rear wheel regenerative braking forces Fgf and Fgr, which can be generated and are determined in the operation states of the front and rear wheel regenerative braking devices KCf and KCr, as the maximum front and rear wheel regenerative braking forces Fxf and Fxr. Then, the controller ECU multiplies the maximum front wheel regenerative braking force Fxf by the ratio (constant value) hb to calculate a rear wheel restricted regenerative braking force Fsr, and determines the smaller one of the maximum rear wheel regenerative braking force Fxr and the rear wheel restricted regenerative braking force Fsr as the rear wheel reference regenerative braking force Fkr. The front wheel required braking force Fqf is achieved only by the front wheel regenerative braking force Fgf when the front wheel required braking force Fqf is equal to or less than the maximum front wheel regenerative braking force Fxf (that is, "Fqf≤Fxf"), and the front wheel required braking force Fqf is achieved by the front wheel regenerative braking force Fgf and the front wheel friction braking force Fmf when the front wheel required braking force Fqf is larger than the maximum front wheel regenerative braking force Fxf (that is, "Fqf>Fxf") In addition, when the rear wheel required braking force Fqr is equal to or less than the rear wheel reference regenerative braking force Fkr (that is, "Fqr≤Fkr"), the rear wheel required braking force Fqr is achieved only by the rear wheel regenerative braking force Fgr, and when the rear wheel required braking force Fqr is larger than the rear wheel reference regenerative braking force Fkr (that is, "Fqr>Fkr"), the rear wheel required braking force Fqr is achieved by the rear wheel regenerative braking force Fgr and the rear wheel friction braking force Fmr.

Since the first embodiment of the braking control device SC has a restriction of "Pwf≤Pwr", the rear wheel regenerative braking force Fgr generated by the rear wheel regenerative braking device KCr is restricted so that the distribution ratio Kq (resultantly, Kb) of the braking force is maintained at the constant value hb. Specifically, the rear wheel regenerative braking force Fgr is restricted based on the smaller one of the maximum rear wheel regenerative braking force Fxr and the rear wheel restricted regenerative braking force Fsr (that is, the rear wheel reference regenerative braking force Fkr). In such a manner, when the front wheel regenerative braking device KCf falls into disorder and the maximum front wheel regenerative braking force Fxf decreases, the distribution ratio Kb of the front and rear wheel braking forces Fbf and Fbr is still maintained constant. That is, the relationship between the front and rear wheel braking forces is optimized, and therefore, the vehicle stability is secured.

An extreme situation in the first embodiment is a case where the front wheel regenerative braking device KCf fails and the front wheel regenerative braking force Fgf cannot be generated. In this case, the generation of the rear wheel regenerative braking force Fgr is prohibited by the controller ECU, and the vehicle stability is maintained. Note that, in order to avoid any effect at the time of disorder of the rear wheel regenerative braking device KCr, the restriction of the fluid unit HU does not apply to the generation of the front wheel regenerative braking force Fgf. For example, in the braking control device SC according to the first embodiment, the front wheel regenerative braking force Fgf is also generated when the rear wheel regenerative braking device KCr fails and the rear wheel regenerative braking force Fgr cannot be generated. That is, the braking control device SC is configured so that the front wheel regenerative braking force Fgf is generated (that is, the generation of the front wheel regenerative braking force Fgf is permitted) when the rear wheel regenerative braking device KCr cannot generate the rear wheel regenerative braking force Fgr (that is, when the rear wheel regenerative braking device KCr fails), but the rear wheel regenerative braking force Fgr is not generated (that is, the generation of the rear wheel regenerative braking force Fgr is prohibited) when the front wheel regenerative braking device KCf cannot generate the front wheel regenerative braking force Fgf (that is, when the front wheel regenerative braking device KCf fails).

In the second embodiment of the braking control device SC, the actuator HU has a restriction that "the front wheel brake fluid pressure Pwf is equal to or larger than the rear wheel brake fluid pressure Pwr (that is, "Pwf≥Pwr")". In this configuration, the controller ECU calculates the target vehicle body braking force Fv and the front and rear wheel required braking forces Fqf and Fqr, and acquires the maximum front and rear wheel regenerative braking forces Fxf and Fxr in the same manner as in the first embodiment. Then, the front wheel restricted regenerative braking force Fsf is calculated by dividing the maximum rear wheel regenerative braking force Fxr by the distribution ratio hb (constant value), and the smaller one of the maximum front wheel regenerative braking force Fxf and the front wheel restricted regenerative braking force Fsf is determined as the front wheel reference regenerative braking force Fkf. The front wheel required braking force Fqf is achieved only by the front wheel regenerative braking force Fgf when the front wheel required braking force Fqf is equal to or less than the front wheel reference regenerative braking force Fkf (that is, "Fqf≤Fkf"), and the front wheel required braking force Fqf is achieved by the front wheel regenerative braking force Fgf and the front wheel friction braking force Fmf when the front wheel required braking force Fqf is larger than the front wheel reference regenerative braking force Fkf (that is, "Fqf>Fkf"). In addition, when the rear wheel required braking force Fqr is equal to or less than the maximum rear wheel regenerative braking force Fxr (that is, "Fqr≤Fxr"), the rear wheel required braking force Fqr is achieved only by the rear wheel regenerative braking force Fgr, and when the rear wheel required braking force Fqr is larger than the maximum rear wheel regenerative braking force Fxr (that is, "Fqr>Fxr"), the rear wheel required braking force Fqr is achieved by the rear wheel regenerative braking force Fgr and the rear wheel friction braking force Fmr.

Since the second embodiment of the braking control device SC has a restriction of "Pwf≥Pwr", the generation of the front wheel regenerative braking force Fgf generated by the front wheel regenerative braking device KCf is restricted so that the distribution ratio Kb (=Fbr/Fbf) of the braking force is maintained at the constant value hb. Specifically, the front wheel regenerative braking force Fgf is restricted based on the smaller one of the maximum front wheel regenerative braking force Fxf and the front wheel restricted regenerative braking force Fsf (that is, the front wheel reference regenerative braking force Fkf). In such a manner, when the rear wheel regenerative braking device KCr falls into disorder and the maximum rear wheel regenerative braking force Fxr decreases, the distribution ratio Kb of the front and rear wheel braking forces Fbf and Fbr is still maintained constant. That is, the relationship between the front and rear wheel braking forces is optimized, and therefore, the vehicle stability is improved.

An extreme situation in the second embodiment is a case where the rear wheel regenerative braking device KCr fails and the front wheel regenerative braking force Fgr cannot be generated. In this case, the generation of the front wheel regenerative braking force Fgf is prohibited by the controller ECU, and the vehicle stability is securely maintained. Note that, in order to avoid any effect at the time of disorder of the front wheel regenerative braking device KCf, the restriction of the fluid unit HU does not apply to the generation of the rear wheel regenerative braking force Fgr. That is, the braking control device SC according to the second embodiment is configured so that the rear wheel regenerative braking force Fgr is generated (that is, the generation of the rear wheel regenerative braking force Fgr is permitted) when the front wheel regenerative braking device KCf cannot generate the front wheel regenerative braking force Fgf (that is, when the front wheel regenerative braking device KCf fails), but the front wheel regenerative braking force Fgf is not generated (that is, the generation of the front wheel regenerative braking force Fgf is prohibited) when the rear wheel regenerative braking device KCr cannot generate the rear wheel regenerative braking force Fgr (that is, when the rear wheel regenerative braking device KCr fails).

OTHER EMBODIMENTS

Hereinafter, other embodiments will be described. In other embodiments, the same effects as described above (optimization of front and rear wheel braking force distribution and improvement of vehicle stability associated therewith) are achieved.

In the embodiment above, the maximum front and rear wheel regenerative braking forces Fxf and Fxr (=Fx) are determined based on the front and rear wheel rotation speeds Ngf and Ngr (=Ng). At the time of regenerative braking, the front and rear wheel generators GNf and GNr are rotationally driven by the front wheel WHf and the rear wheel WHr. Therefore, instead of the front and rear wheel rotation speeds Ngf and Ngr, the rotation speeds of the rotating constituent members from the front and rear wheel generators GNf and GNr to the front wheel WHf and the rear wheel WHr can be adopted. For example, instead of the front and rear wheel rotation speeds Ngf and Ngr, the wheel speeds Vwf and Vwr (=Vw) of the front wheel WHf and the rear wheel WHr are adopted. Alternatively, the vehicle body speed Vx calculated based on the wheel speed Vw may also be adopted. That is, the maximum regenerative braking force Fx is determined (calculated) based on at least one of the generator rotation speed Ng, the wheel speed Vw, and the vehicle body speed Vx.

In the embodiment above, in the communication between the braking controller ECU and the front and rear wheel regenerative controllers EGf and EGr, the dimension of "force" is adopted as the physical quantity of the maximum regenerative braking force Fx (=Fxf, Fxr) and the target regenerative braking force Fh (=Fhf, Fhr). Since the specifications of the braking device SX, the braking control device SC and the regenerative braking device KC, and the state quantity (wheel speed Vw, vehicle body speed Vx, etc.) of the vehicle are known, other convertible physical quantities (for example, the torque amount and the power amount) may be adopted as the physical quantities of the maximum regenerative braking force Fx and the target regenerative braking force Fh. For example, the front and rear wheel power amount limits Rxf and Rxr (=Rx) are transmitted from the regeneration controller EG to the braking controller ECU as limit values (upper limit values) of the regeneratable power amount. Then, the power amount limit Rx is converted and calculated by the braking controller ECU, and the maximum regenerative braking force Fx can be determined. In addition, the target power amount Rh (=Rhf, Rhr) is calculated based on the target regenerative braking force Fh and transmitted to the regenerative controller EG (=EGf, EGr) by the braking controller ECU. Then, the actual regenerative power amount Rg (=Rgf, Rgr) is adjusted by the regenerative controller EG based on the target power amount Rh. As a result, the regenerative braking force Fg (=Fgf, Fgr) corresponding to the regenerative power amount Rg is generated. In any case, the regenerative braking force Fg corresponding to the target regenerative braking force Fh is generated.

The invention claimed is:

1. A braking control device for a vehicle applied to a vehicle including front and rear wheel regenerative braking devices that generate front and rear wheel regenerative braking forces on a front wheel and a rear wheel, the braking control device for a vehicle comprising:

an actuator that supplies a front wheel brake fluid pressure to a front wheel cylinder and supplies a rear wheel brake fluid pressure equal to or larger than the front wheel brake fluid pressure to a rear wheel cylinder, and generates front and rear wheel frictional braking forces on the front wheel and the rear wheel; and a controller that controls the front and rear wheel regenerative braking devices and the actuator, wherein the controller calculates a braking force required by a whole of the vehicle as a target vehicle body braking force, calculates front and rear wheel required braking forces so that, a sum of the braking force required for the vehicle overall and the braking force matches the target vehicle body braking force, and a ratio of the rear wheel required braking force to the front wheel required braking force is a constant value, acquires maximum values of the front and rear wheel regenerative braking forces that can be generated and are determined in operation states of front and rear wheel regenerative braking devices as maximum front and rear wheel regenerative braking force, calculates a rear wheel restricted regenerative braking force by multiplying the maximum front wheel regenerative braking force by the constant value, determines a smaller one of the maximum rear wheel regenerative braking force and the rear wheel restricted regenerative braking force as a rear wheel reference regenerative braking force, achieves the front wheel required braking force by only the front wheel regenerative braking force when the front wheel required braking force is equal to or less than the maximum front wheel regenerative braking force, and by the front wheel regenerative braking force and the front wheel friction braking force when the front wheel required braking force is larger than the maximum front wheel regenerative braking force, and achieves the rear wheel required braking force by only the rear wheel regenerative braking force when the rear wheel required braking force is equal to or less than the rear wheel reference regenerative braking force, and by the rear wheel regenerative braking force and the rear wheel friction braking force when the rear wheel required braking force is larger than the rear wheel reference regenerative braking force.

2. The braking control device for the vehicle according to claim 1, wherein the controller prohibits the generation of the rear wheel regenerative braking force when the front wheel regenerative braking device fails to generate the front wheel regenerative braking force.

3. A braking control device for a vehicle applied to a vehicle including front and rear wheel regenerative braking devices that generate front and rear wheel frictional braking forces on a front wheel and a rear wheel, the braking control device for a vehicle comprising:

an actuator that supplies a rear wheel brake fluid pressure to a rear wheel cylinder and supplies a front wheel brake fluid pressure equal to or larger than the rear wheel brake fluid pressure to a front wheel cylinder, and generates front and rear wheel frictional braking forces on the front wheel and the rear wheel; and a controller that controls the front and rear wheel regenerative braking devices and the actuator, wherein the controller calculates a braking force required by a whole of the vehicle as a target vehicle body braking force, calculates braking force required for the vehicle overall and the braking force so that, a sum of the braking force required for the vehicle overall and the braking force matches the target vehicle body braking force, and a ratio of the rear wheel required braking force to the front wheel required braking force is a constant value, acquires maximum values of the front and rear wheel regenerative braking forces that can be generated and are determined in operation states of front and rear wheel regenerative braking devices as maximum front and rear wheel regenerative braking force, calculates a front wheel restricted regenerative braking force by dividing maximum rear wheel regenerative braking force by the constant value, determines a smaller one of the maximum front wheel regenerative braking force and the front wheel restricted regenerative braking force as a front wheel reference regenerative braking force, achieves the front wheel required braking force by only the front wheel regenerative braking force when the front wheel required braking force is equal to or less than the front wheel reference regenerative braking force, and by the front wheel regenerative braking force and the front wheel friction braking force when the front wheel required braking force is larger than the front wheel reference regenerative braking force, and achieves the rear wheel required braking force by only the rear wheel regenerative braking force when the rear wheel required braking force is equal to or less than maximum rear wheel regenerative braking force, and by the rear wheel regenerative braking force and the rear wheel friction braking force when the rear wheel required braking force is larger than maximum rear wheel regenerative braking force.

4. The braking control device for vehicle according to claim 3, wherein the controller prohibits the generation of the front wheel regenerative braking force when the rear wheel regenerative braking device fails to generate the rear wheel regenerative braking force.

* * * * *